United States Patent
Xu et al.

(10) Patent No.: US 10,554,328 B2
(45) Date of Patent: Feb. 4, 2020

(54) DATA TRANSMISSION METHOD AND APPARATUS

(71) Applicant: HUAWEI TECHNOLOGIES CO., LTD., Shenzhen, Guangdong (CN)

(72) Inventors: Xiuqiang Xu, Shanghai (CN); Yalin Liu, Shenzhen (CN); Yan Chen, Shanghai (CN)

(73) Assignee: Huawei Techonologies Co., Ltd., Shenzhen (CN)

( * ) Notice: Subject to any disclaimer, the term of this patent is extended or adjusted under 35 U.S.C. 154(b) by 211 days.

(21) Appl. No.: 15/858,843

(22) Filed: Dec. 29, 2017

(65) Prior Publication Data

US 2018/0145790 A1 May 24, 2018

Related U.S. Application Data

(63) Continuation of application No. PCT/CN2015/082722, filed on Jun. 30, 2015.

(51) Int. Cl.
*H04L 1/00* (2006.01)
*H04W 72/04* (2009.01)
(Continued)

(52) U.S. Cl.
CPC ............ *H04L 1/001* (2013.01); *H04L 1/0004* (2013.01); *H04W 72/0413* (2013.01); *H04W 74/08* (2013.01); *H04L 5/0048* (2013.01)

(58) Field of Classification Search
CPC ..... H04L 1/001; H04L 1/0004; H04L 5/0048; H04W 72/0413; H04W 74/08
See application file for complete search history.

(56) References Cited

U.S. PATENT DOCUMENTS

2009/0092086 A1 4/2009 Lee et al.
2013/0107838 A1 5/2013 Li et al.
(Continued)

FOREIGN PATENT DOCUMENTS

CN  1444352 A  9/2003
CN  1996806 A  7/2007
(Continued)

OTHER PUBLICATIONS

International Search Report dated Mar. 25, 2016 in corresponding International Patent Application No. PCT/CN2015/082722, 7 pgs.
(Continued)

*Primary Examiner* — Michael Thier
*Assistant Examiner* — Brian P Cox
(74) *Attorney, Agent, or Firm* — Slater Matsil, LLP

(57) ABSTRACT

Embodiments of the present invention provide a data transmission method and apparatus. The method includes: determining a contention transmission unit CTU to be used by to-be-sent uplink data, where the CTU is a transmission resource including at least a time domain resource, a frequency domain resource, and a code domain resource; encoding the to-be-sent uplink data by using N different code element groups in the code domain resource corresponding to the determined CTU, to obtain N groups of encoded data, where N is a positive integer greater than or equal to 2; and sending the N groups of encoded data by using the time domain and frequency domain resources that are corresponding to the determined CTU. According to the embodiments of the present invention, data reception reliability at a receive end can be improved.

17 Claims, 12 Drawing Sheets

(51) Int. Cl.
*H04W 74/08* (2009.01)
*H04L 5/00* (2006.01)

(56) References Cited

U.S. PATENT DOCUMENTS

| 2014/0169408 | A1* | 6/2014 | Bayesteh | H04B 7/0473 |
| | | | | 375/144 |
| 2014/0254544 | A1* | 9/2014 | Kar Kin Au | H04L 5/0033 |
| | | | | 370/330 |
| 2016/0065351 | A1 | 3/2016 | Zhang et al. | |
| 2016/0323911 | A1 | 11/2016 | Au et al. | |
| 2017/0034841 | A1* | 2/2017 | Bethanabhotla | H04W 28/08 |

FOREIGN PATENT DOCUMENTS

| CN | 102158932 A | 8/2011 |
| CN | 102291826 A | 12/2011 |
| WO | 2014075637 A1 | 5/2014 |
| WO | 2014090200 A1 | 6/2014 |
| WO | 2014/135126 A1 | 9/2014 |
| WO | 2014179953 A1 | 11/2014 |

OTHER PUBLICATIONS

Written Opinion of the International Search Authority dated Mar. 25, 2016 in corresponding International Patent Application No. PCT/CN2015/082722, 5 pgs.

Orfanos, et al., "A new Distributed Coordination Function for W-LANs with multiple channel structure," Proceedings of 14$^{th}$ IST Mobile & Wireless Communications Summit, Dresden, Germany, Jun. 19-23, 2005, XP002756497, 5 pgs.

Extended European Search Report dated May 18, 2018, in corresponding European Patent Application No. 15896676.2, 8 pgs.

International Search Report dated Mar. 25, 2016 in corresponding International Application No. PCT/CN2015/082722.

* cited by examiner

300

Determine a contention transmission unit CTU to be used by to-be-sent uplink data, where the CTU is a transmission resource including at least a time domain resource, a frequency domain resource, and a code domain resource ⟶ 310

Encode the to-be-sent uplink data by using N code element groups in the code domain resource corresponding to the determined CTU, to obtain N groups of encoded data, where different groups of the N groups of encoded data use different code domain resources, and N is a positive integer greater than or equal to 2 ⟶ 320

Send the N groups of encoded data by using the time domain and frequency domain resources that are corresponding to the determined CTU ⟶ 330

Decode, by using a code domain resource of a CTU, a control word in uplink data received on a time domain resource and a frequency domain resource of the CTU, to obtain instruction information, where the CTU is a transmission resource including at least the time domain resource, the frequency domain resource, and the code domain resource, and the instruction information is used to instruct whether to perform combined decoding on a corresponding data portion    — 510

Perform combined decoding on data portions of uplink data that is sent by a same terminal device and in which the control words are used to instruct to perform combined decoding on the corresponding data portions of the uplink data    — 520

Determine a CTU to be used by to-be-sent uplink data, where the CTU is a transmission resource including at least a time domain resource, a frequency domain resource, a code domain resource, and a pilot resource, a code element of the code domain resource and the pilot resource constitute a code element-pilot combination, and pilots in different code element-pilot combinations are mutually orthogonal — 610

Encode the to-be-sent uplink data by using a code element in a code element-pilot combination corresponding to the determined CTU, to obtain N groups of encoded data, where N is a positive integer greater than or equal to 2 — 620

Send, by using the time domain and frequency domain resources that are corresponding to the determined CTU, the N groups of encoded data — 630

Perform, on a time domain resource and a frequency domain resource of a CTU, blind detection of a pilot in a code domain resource–pilot combination, where the CTU is a transmission resource including at least the time domain resource, the frequency domain resource, a code domain resource, and a pilot resource, the code domain resource and the pilot resource constitute a code domain resource–pilot combination, and pilots in different code domain resource–pilot combinations are mutually orthogonal ⸺ 710

Decode, by using a code domain resource in a code domain resource–pilot combination corresponding to a pilot sequence obtained by means of blind detection, a control word in uplink data received on the CTU, to obtain instruction information, where the instruction information is used to instruct whether to perform combined decoding on a corresponding data portion ⸺ 720

Perform combined decoding on data portions of uplink data that is sent by a same terminal device and in which the instruction information is used to instruct to perform combined decoding on the corresponding data portions of the uplink data ⸺ 730

FIG. 9

DATA TRANSMISSION METHOD AND APPARATUS

CROSS-REFERENCE TO RELATED APPLICATIONS

This application is a continuation of International Patent Application No. PCT/CN2015/082722, filed on Jun. 30, 2015, which is hereby incorporated by reference in its entirety.

TECHNICAL FIELD

The present disclosure relates to the communications field, and more specifically, to a data transmission method and apparatus.

BACKGROUND

In a Long Term Evolution (Long Term Evolution, LTE) system, when uplink data needs to be transmitted, user equipment (User Equipment, UE) uses an uplink scheduling request (Scheduling Request, SR) mechanism. The UE sends an uplink scheduling request to a base station, and notifies the base station that the UE requires an uplink resource to transmit data. After receiving the scheduling request from the UE, the base station allocates some resources to the UE, and the UE transmits data on these allocated resources. However, this mechanism causes heavy signaling overheads.

To resolve the foregoing problem, a grant-free (Grant Free) technical solution has been provided. Grant free means that in a public land mobile network (Public Land Mobile Network, PLMN), UE does not need to request, by using a scheduling request, a base station to allocate a resource for data transmission. A grant-free user may directly use a grant-free transmission mode to transmit a packet on a contention transmission unit (contention transmission unit, CTU) according to different data transmission characteristics, such as requirements on a transmission delay or reliability.

Uplink grant free (Grant free) may reduce overheads and redundancy caused by frequent scheduling requests. On an uplink channel, instead of requesting a resource, a grant-free terminal directly uses a grant-free resource to perform uplink transmission.

An uplink grant-free transmission method based on a contention transmission unit (contention transmission unit) is provided in the prior art.

A terminal selects one CTU from one or more CTUs to send uplink data. However, if different terminals select a same code domain resource in a same CTU, a receive end cannot decode the data sent by the terminals. This reduces decoding reliability.

SUMMARY

Embodiments of the present invention provide a data transmission method and apparatus, to improve data reception reliability at a receive end.

According to one aspect, a data transmission method is provided, including:

determining a contention transmission unit CTU to be used by to-be-sent uplink data, where the CTU is a transmission resource including at least a time domain resource, a frequency domain resource, and a code domain resource;

encoding the to-be-sent uplink data by using N different code element groups in the code domain resource corresponding to the determined CTU, to obtain N groups of encoded data, where N is a positive integer greater than or equal to 2; and sending the N groups of encoded data by using the time domain and frequency domain resources that are corresponding to the determined CTU.

According to another aspect, a data transmission method is provided, including:

determining a contention transmission unit CTU to be used by to-be-sent uplink data, where the CTU is a transmission resource including at least a time domain resource, a frequency domain resource, a code domain resource, and a pilot resource, a code element of the code domain resource and the pilot resource constitute a code element-pilot combination, and pilots in different code element-pilot combinations are mutually orthogonal;

encoding the to-be-sent uplink data by using code elements in N different code element-pilot combinations in the transmission resource corresponding to the determined CTU, to obtain N groups of encoded data, where N is a positive integer greater than or equal to 2; and sending, by using the time domain and frequency domain resources that are corresponding to the determined CTU, the N groups of encoded data and pilots in the N code element-pilot combinations.

According to another aspect, a data transmission method is provided, including:

decoding, by using a code element of a code domain resource of a contention transmission unit CTU, a control word in uplink data received on time domain and frequency domain resources of the CTU, to obtain instruction information, where the CTU is a transmission resource including at least the time domain resource, the frequency domain resource, and the code domain resource, and the instruction information is used to instruct whether to perform combined decoding on a corresponding data portion; and performing combined decoding on data portions of uplink data that is sent by a same terminal device and in which the instruction information instructs to perform combined decoding on the corresponding data portions of the uplink data.

According to another aspect, a data transmission method is provided, including:

performing, on time domain and frequency domain resources of a contention transmission unit CTU, blind detection of a pilot in a code element-pilot combination, where the CTU is a transmission resource including at least the time domain resource, the frequency domain resource, a code domain resource, and a pilot resource, a code element of the code domain resource and the pilot resource constitute a code element-pilot combination, and pilots in different code element-pilot combinations are mutually orthogonal;

decoding, by using code elements in code element-pilot combinations corresponding to a pilot sequence obtained by means of blind detection, a control word in uplink data received on the time domain and frequency domain resources of the CTU, to obtain instruction information, where the instruction information is used to instruct whether to perform combined decoding on a corresponding data portion; and performing combined decoding on data portions of uplink data that is sent by a same terminal device and in which the instruction information instructs to perform combined decoding on the corresponding data portions of the uplink data.

According to another aspect, a data transmission apparatus is provided, including:

a determining unit, configured to determine a contention transmission unit CTU to be used by to-be-sent uplink data, where the CTU is a transmission resource including at least a time domain resource, a frequency domain resource, and a code domain resource;

an encoding unit, configured to encode the to-be-sent uplink data by using N different code element groups in the code domain resource corresponding to the CTU determined by the determining unit, to obtain N groups of encoded data, where N is a positive integer greater than or equal to 2; and a sending unit, configured to send the N groups of encoded data by using the time domain and frequency domain resources that are corresponding to the CTU determined by the determining unit.

According to another aspect, a data transmission apparatus is provided, including:

a determining unit, configured to determine a contention transmission unit CTU to be used by to-be-sent uplink data, where the CTU is a transmission resource including at least a time domain resource, a frequency domain resource, a code domain resource, and a pilot resource, a code element of the code domain resource and the pilot resource constitute a code element-pilot combination, and pilots in different code element-pilot combinations are mutually orthogonal;

an encoding unit, configured to encode the to-be-sent uplink data by using code elements in N different code element-pilot combinations in a transmission resource corresponding to the CTU determined by the determining unit, to obtain N groups of encoded data, where N is a positive integer greater than or equal to 2; and a sending unit, configured to send, by using the time domain and frequency domain resources that are corresponding to the CTU determined by the determining unit, the N groups of encoded data and pilots in the N code element-pilot combinations.

According to another aspect, a data transmission apparatus is provided, including:

a first decoding unit, configured to decode, by using a code element of a code domain resource of a contention transmission unit CTU, a control word in uplink data received on time domain and frequency domain resources of the CTU, to obtain instruction information, where the CTU is a transmission resource including at least the time domain resource, the frequency domain resource, and the code domain resource, and the instruction information is used to instruct whether to perform combined decoding on a corresponding data portion; and a second decoding unit, configured to perform combined decoding on data portions of uplink data that is sent by a same terminal device and in which the instruction information instructs to perform combined decoding on the corresponding data portions of the uplink data.

According to another aspect, a data transmission apparatus is provided, including:

a detection unit, configured to perform, on time domain and frequency domain resources of a contention transmission unit CTU, blind detection of a pilot in a code element-pilot combination, where the CTU is a transmission resource including at least the time domain resource, the frequency domain resource, a code domain resource, and a pilot resource, a code element of the code domain resource and the pilot resource constitute a code element-pilot combination, and pilots in different code element-pilot combinations are mutually orthogonal;

a first decoding unit, configured to decode, by using code elements in code element-pilot combinations corresponding to a pilot sequence obtained by means of blind detection by the detection unit, a control word in uplink data received on the time domain and frequency domain resources of the CTU, to obtain instruction information, where the instruction information is used to instruct whether to perform combined decoding on a corresponding data portion; and a second decoding unit, configured to perform combined decoding on data portions of uplink data that is sent by a same terminal device and in which the instruction information instructs to perform combined decoding on the corresponding data portions of the uplink data.

According to another aspect, a data transmission apparatus is provided, including:

a processor, a memory, and a transmitter, where the memory is configured to store program code, and the processor is configured to call the program code in the memory to perform the following operations:

determining a contention transmission unit CTU to be used by to-be-sent uplink data, where the CTU is a transmission resource including at least a time domain resource, a frequency domain resource, and a code domain resource;

encoding the to-be-sent uplink data by using N different code element groups in the code domain resource corresponding to the determined CTU, to obtain N groups of encoded data, where N is a positive integer greater than or equal to 2; and sending the N groups of encoded data by using the time domain and frequency domain resources that are corresponding to the determined CTU.

According to another aspect, a data transmission apparatus is provided, including:

a processor, a memory, and a transmitter, where the memory is configured to store program code, and the processor is configured to call the program code in the memory to perform the following operations:

determining a contention transmission unit CTU to be used by to-be-sent uplink data, where the CTU is a transmission resource including at least a time domain resource, a frequency domain resource, a code domain resource, and a pilot resource, a code element of the code domain resource and the pilot resource constitute a code element-pilot combination, and pilots in different code element-pilot combinations are mutually orthogonal;

encoding the to-be-sent uplink data by using code elements in N different code element-pilot combinations in the transmission resource corresponding to the determined CTU, to obtain N groups of encoded data, where N is a positive integer greater than or equal to 2; and sending, by using the time domain and frequency domain resources that are corresponding to the determined CTU, the N groups of encoded data and pilots in the N code element-pilot combinations.

Therefore, in the embodiments of the present invention, a CTU to be used by to-be-sent uplink data is determined; the to-be-sent uplink data is encoded by using N different code element groups in a code domain resource corresponding to the determined CTU, to obtain N groups of encoded data; and the N groups of encoded data are sent by using time domain and frequency domain resources that are corresponding to the determined CTU. In this way, when a terminal device encodes to-be-sent uplink data by using a code domain resource, provided that a code domain resource used by one group of to-be-sent data obtained by means of encoding does not conflict with a code domain resource used by another terminal device, a receive end can correctly obtain the uplink data sent by the terminal device, thereby improving data reception reliability at the receive end.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 4 is a schematic flowchart of a data transmission method according to another embodiment of the present invention;

FIG. 7 is a schematic flowchart of a data transmission method according to another embodiment of the present invention;

FIG. 8 is a schematic flowchart of a data transmission method according to another embodiment of the present invention;

FIG. 9 is a schematic flowchart of a data transmission method according to another embodiment of the present invention;

DESCRIPTION OF EMBODIMENTS

Figure 1:
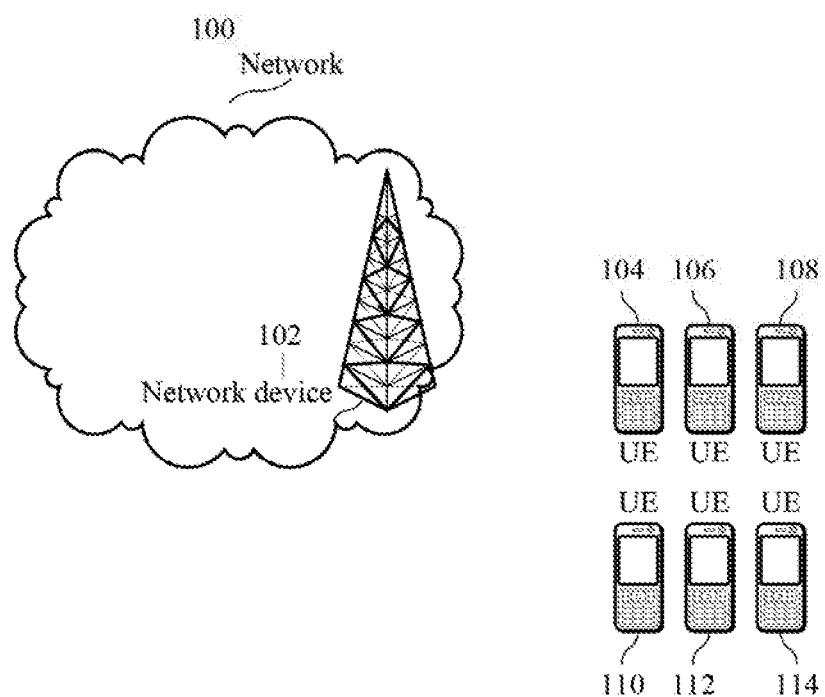
FIG. 1 is a schematic architecture diagram of a communications system to which an embodiment of the present invention is applied.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (such as data from a component interacting with another component in a local system, a distributed system, and/or across a network such as the Internet interacting with other systems by using the signal).

It should be understood that, the technical solutions of the embodiments of the present invention may be applied to various communications systems, such as a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunications System (Universal Mobile Telecommunication System, "UMTS" for short), and a future 5G communications system.

The present invention describes the embodiments with reference to a terminal device. The terminal device may be referred to as user equipment (User Equipment, "UE" for short), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a computing device, another processing device connected to a wireless modem, an in-vehicle device, a wearable device, or a terminal device in a future 5G network or a future evolved PLMN.

The present invention describes the embodiments with reference to a network device. The network device may be a device that communicates with a terminal device. For example, the network device may be a base station (Base Transceiver Station, "BTS" for short) in a GSM system or a CDMA system, may be a base station (NodeB, "NB" for short) in a WCDMA system, or may be an evolved eNodeB (evolved NodeB, "eNB" or "eNodeB" for short) in an LTE system. Alternatively, the network device may be a relay station, an access point, an in-vehicle device, a wearable device, a network-side device in a future 5G network, or a network device in a future evolved PLMN network.

In addition, aspects or features of the present invention may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (such as a hard disk, a floppy disk, or a magnetic tape), an optical disc (such as a CD (Compact Disc, compact disc), or a DVD (Digital Versatile Disc, digital versatile disc), a smart card, and a flash memory component (such as an EPROM (Erasable Programmable Read-Only Memory, erasable programmable read-only memory), a card, a stick, or a key drive). In addition, various storage media described in this specification may indicate one or more devices and/or other machine-readable media configured to store information. The term "machine-readable media" may include but is not limited to a radio channel and various other media that can store, contain and/or carry an instruction and/or data.

Existing cellular communications systems such as GSM, WCDMA, and LTE, support mainly voice and data communication. Generally, a quantity of connections supported by a conventional base station is limited, and is easy to implement.

A next-generation mobile communications system not only supports conventional communication, but also supports machine to machine (Machine to Machine, "M2M" for short) communication, which is also referred to as machine type communication (Machine Type Communication, "MTC" for short). It is predicted that a quantity of MTC devices connected to networks will be up to 50 billion to 100 billion by 2020. This quantity will be far greater than a quantity of existing connections. M2M services are diverse in service types, and different types of M2M services have quite different network requirements. Roughly, there may be the following several requirements: (I) reliable delay-insensitive transmission; and (II) highly reliable low-delay transmission.

A service that needs reliable delay-insensitive transmission is relatively easy to process. However, a service that needs highly reliable low-delay transmission, such as a V2V (English full name: Vehicle-to-Vehicle) service, needs not only a low transmission delay but also high reliability. Unreliable transmission causes retransmission. As a result, the transmission delay becomes excessively high, and requirements cannot be met.

Existence of a large quantity of connections makes a future wireless communications system differ greatly from an existing communications system. Because of the large quantity of connections, more resources need to be consumed for UE to access, and more resources need to be consumed for data transmission of a terminal device and transmission of scheduling signaling related to data transmission of a terminal device.

FIG. 1 is a schematic architecture diagram of a communications system 100 to which an embodiment of the present invention is applied. As shown in FIG. 1, the communications system 100 may include a network device 102 and terminal devices 104 to 114 (referred to as UE for short in the figure). The network device 102 and the terminal devices 104 to 114 are connected in a wired manner, a wireless manner, or another manner.

A network in this embodiment of the present invention may be a public land mobile network (Public Land Mobile Network, "PLMN" for short), a D2D network, an M2M network, or another network. FIG. 1 is merely an example of a simplified schematic diagram. The network may further include another network device that is not shown in FIG. 1.

To deal with a large quantity of MTC services in a future network and to meet a requirement of highly reliable low-delay transmission of services, a grant-free (Grant Free) transmission solution is provided in the present invention. Grant-free transmission herein may be specific to uplink data transmission. Grant-free transmission may be understood as one or more of the following meanings, or a combination of some technical features in multiple meanings, or another similar meaning:

1. Grant-free transmission: A network device preallocates multiple transmission resources and notifies a terminal device of the multiple transmission resources. When the terminal device has an uplink data transmission requirement, the terminal device selects at least one transmission resource from the multiple transmission resources preallocated by the network device, and sends uplink data by using the selected transmission resource. The network device detects, on one or more of the preallocated multiple transmission resources, the uplink data sent by the terminal device. The detection may be blind detection, may be detection performed according to a control field in the uplink data, or may be detection performed in another manner.

2. Grant-free transmission: A network device preallocates multiple transmission resources and notifies a terminal device of the multiple transmission resources, so that the terminal device selects, when the terminal device has an uplink data transmission requirement, at least one transmission resource from the multiple transmission resources preallocated by the network device, and sends uplink data by using the selected transmission resource.

3. Grant-free transmission: Information about preallocated multiple transmission resources is obtained. When there is an uplink data transmission requirement, at least one transmission resource is selected from the multiple transmission resources, and uplink data is sent by using the selected transmission resource. The information may be obtained from a network device.

4. Grant-free transmission may refer to a method for transmitting uplink data by a terminal device without dynamic scheduling performed by a network device. The dynamic scheduling may be a scheduling manner in which the network device indicates, by using signaling, a transmission resource for each uplink data transmission of the terminal device. Optionally, it may be understood that implementation of uplink data transmission of the terminal device means that two or more terminal devices are allowed to perform uplink data transmission on a same time-frequency resource. Optionally, the transmission resource may be a resource transmitted at one or more transmission time units that are after a moment at which UE receives the signaling. One transmission time unit may be a minimum time unit for one transmission, for example, a transmission time interval (Transmission Time Interval, "TTI" for short) with a value of 1 ms. Alternatively, one transmission time unit may be a preset transmission time unit.

5. Grant-free transmission: A terminal device transmits uplink data without a grant from a network device. For the meaning of the grant, a terminal device sends an uplink scheduling request to a network device, and after receiving the scheduling request, the network device sends an uplink grant to the terminal device, and the uplink grant indicates an uplink transmission resource allocated to the terminal device.

6. Grant-free transmission may refer to a contention transmission mode in which specifically multiple terminals simultaneously transmit uplink data on a same preallocated time-frequency resource without a grant from a base station.

The data may include service data or signaling data.

The blind detection may be understood as detection performed, when it is not predicted whether data has arrived, on data that may arrive. The blind detection may also be understood as detection performed without an explicit signaling instruction.

The transmission resource may include but is not limited to one or a combination of the following resources: a time domain resource such as a radio frame, a subframe, or a symbol; a frequency domain resource such as a subcarrier or a resource block; a space domain resource such as a transmit antenna or a beam; a code domain resource such as a sparse code multiple access (Sparse Code Multiple Access, "SCMA" for short) codebook, a low-density signature (Low Density Signature, "LDS" for short) sequence, or a CDMA code; or an uplink pilot resource.

The transmission resource may be used for transmission according to a control mechanism that includes but is not limited to the following: uplink power control such as uplink transmit power upper-limit control; modulation and coding scheme setting such as transport block size setting, bit rate setting, and modulation order setting; and a retransmission mechanism such as a HARQ mechanism.

A contention transmission unit (English full name: Contention Transmission Unit, CTU for short) may be a basic transmission resource in grant-free transmission. The CTU may be a transmission resource including a time resource, a frequency resource, and a code domain resource; may refer to a transmission resource including a time resource, a frequency resource, and a pilot resource; or may refer to a transmission resource including a time resource, a frequency resource, a code domain resource, and a pilot resource.

A CTU access region may refer to a time-frequency region for grant-free transmission.

During grant-free transmission, the terminal device may be in a connected state or in an idle state. In the idle state, context resources of the terminal device and the network device have been released, and when a grant-free transmission mode is used to transmit a packet, encryption and decryption keys used in the connected state cannot be used again. Therefore, data transmission security cannot be ensured. In addition, in the grant-free transmission mode, because redundant additional information of a protocol stack decreases a transmission rate, the protocol stack should be as simple and efficient as possible. Moreover, a network device in a connected state identifies a user by temporarily allocating a cell radio network temporary identifier (Cell RNTI, C-RNTI) to a terminal device. However, the C-RNTI used in the connected state cannot be used to identify a user in GF transmission in the idle state. When the terminal device performs GF transmission, encapsulation is not required, and an IP packet at an application layer is directly forwarded. This can implement simple and efficient transmission. However, in GF transmission, a CTU resource is a resource that is allocated by the base station and that may be simultaneously used by multiple terminal devices by means of contention instead of being separately used by the terminal device. Therefore, packet masquerading or packet attack from another terminal device is likely to occur, affecting security.

Figure 2:
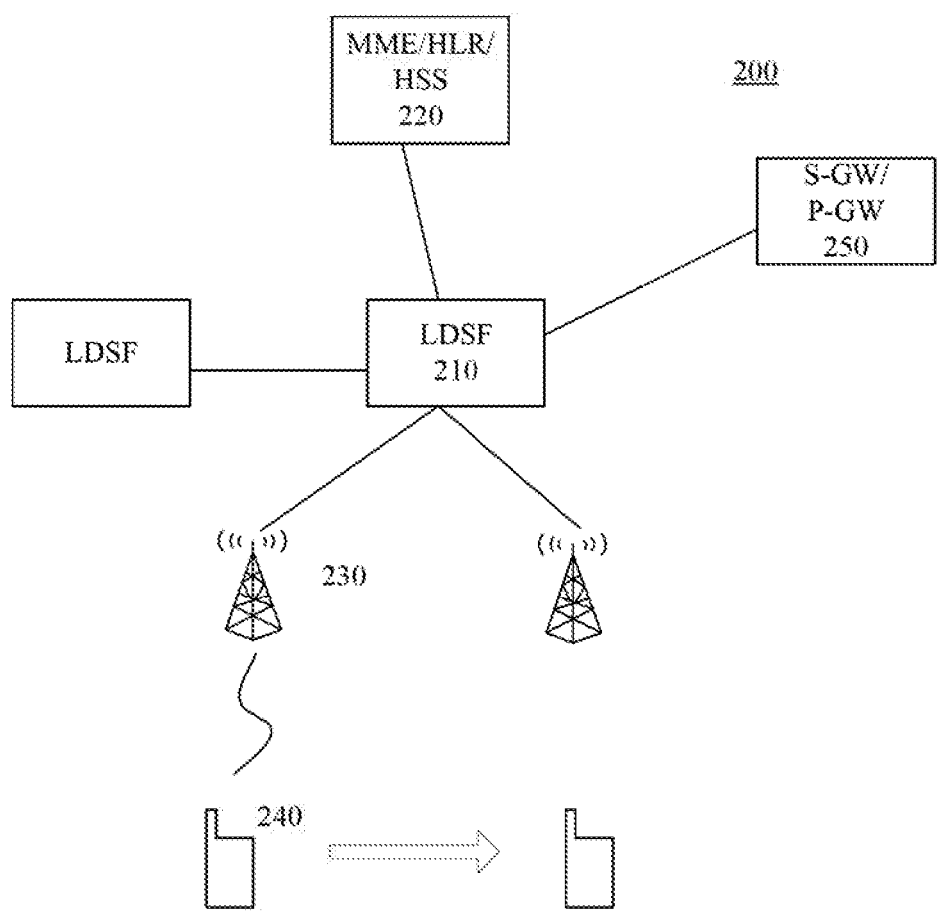
FIG. 2 is a schematic architecture diagram of a communications system according to another embodiment of the present invention.

FIG. 2 is a schematic architecture diagram of a communications system 200 according to another embodiment of the present invention.

The system 200 includes network nodes such as a low-delay service function (Low Delay Service Function, LDSF) entity 210, a base station 230, an MME/HLR/home subscriber server (Home Subscriber Server, HSS) 220, and a serving gateway (Serving Gateway, S-GW)/public data network gateway (Public Data Network Gateway, P-GW) 250. User equipment 240 communicates with the base station 230 over an air interface. The LDSF 210 may be a logical functional entity or an actual physical device. The LDSF is mainly responsible for two grant-free transmission subfunctions: a function of identity registration of user equipment that supports grant-free transmission and a function of grant-free transmission data (such as packets) distribution.

For example, when the user equipment performs grant-free transmission, the user equipment requests to register a grant-free transmission identity with the LDSF by using the base station, and the LDSF allocates a cipher key dedicated to grant-free transmission and a user equipment identifier to the user equipment. The user equipment uses the cipher key and the user equipment identifier to encrypt and encapsulate data, and transmits the data in the grant-free transmission mode. After receiving the data that is transmitted by the user equipment in the grant-free mode, the base station sends the data to the LDSF, and the LDSF distributes the data according to a destination address carried in the data.

It should be understood that the LDSF in this embodiment of the present invention may be an MME or another logical functional entity of a core network device. In the following, for ease of description, the LDSF being a separate physical device is used as an example for description unless otherwise specified.

It should be understood that the system 200 may include at least one LDSF. Each base station is connected to at least one LDSF. After the base station is started, a transmission channel for packet transmission in a grant-free mode is maintained between the base station and the LDSF. For example, when the LDSF is a logical functional entity of the MME, an interface between the LDSF and the network device is an S1 interface. When the LDSF is an individual physical device, the LDSF and the network device may be connected by using an interface similar to the S1 interface.

It should be further understood that the embodiment of FIG. 1 is described by using an example in which the network device is a base station, and the network device may be another access device (such as an radio access point).

Figure 3:
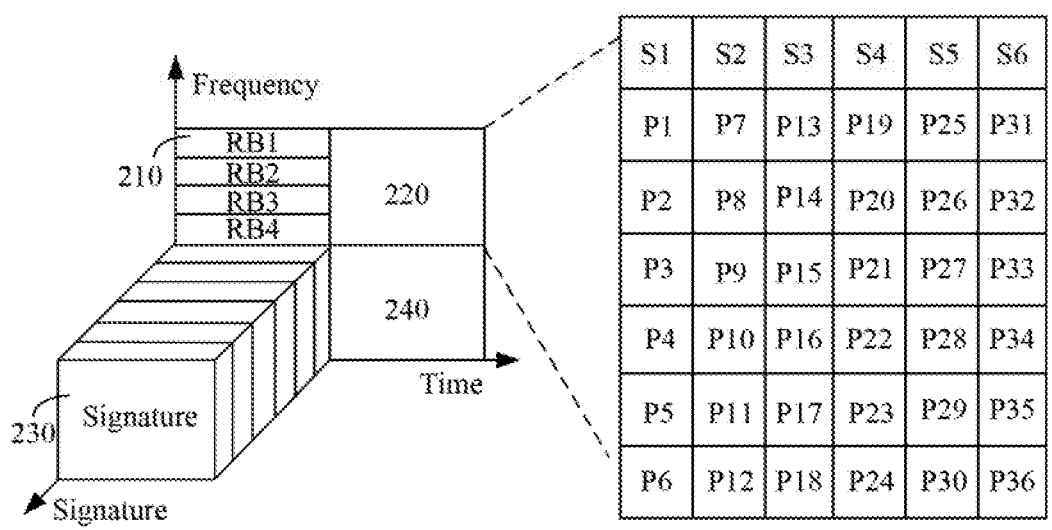
FIG. 3 is a schematic diagram of a CTU resource definition according to an embodiment of the present invention.

FIG. 3 is a schematic diagram of a CTU resource definition according to an embodiment of the present invention.

FIG. 3 shows four contention access regions (also referred to as CTU access regions) 210, 220, 230, and 240, and an available bandwidth is divided into time-frequency regions of the four contention access regions. Each contention access region may occupy a predetermined quantity of resource blocks (Resource Block). For example, in the embodiment of FIG. 3, the contention access region 210 includes four RBs: an RB1, an RB2, an RB3, and an RB4. This embodiment of the present invention is not limited thereto. For example, different contention access regions may include different quantities of RBs. In FIG. 3, each contention access region can support 36 UEs contending for 36 CTUs defined in the contention region. Each CTU is a combination of a time resource, a frequency resource, a code resource or a signature, and a pilot. The code resource includes a CDMA code, an SCMA (Sparse Code Multiple Access) code, an LDS (Low Density Signature), or another signature (signature). Each contention access region occupies one time-frequency resource region. Each time-frequency resource region supports six signatures (S1 to S6), and each signature is mapped to six pilots. Therefore, a total of 36 pilots (P1 to P36) are generated. A network device may use a pilot or a signature decorrelator to detect or decode a signal sent on a CTU by each UE.

When entering a coverage area of a source network device, the UE may receive higher layer signaling sent by the network device. The higher layer signaling may carry a CTU access region definition (CTU access region definition), a total quantity of CTUs, a default mapping rule, and the like. Alternatively, the UE may preconfigure the default mapping rule. The UE may determine an appropriate CTU to perform grant-free transmission on the CTU. When different UEs perform grant-free transmission on a same CTU, that is, contending for a same CTU, a conflict occurs. The UE may determine, according to an indication of the network device, whether there is a conflict. For example, an asynchronous HARQ method may be used to resolve a problem caused by the conflict. However, if a quantity of conflicts exceeds a predetermined threshold, the network device may be requested to remap a CTU. The network device sends information about the remapped CTU to the UE, so that the UE performs grant-free transmission on the remapped CTU.

It should be understood that, for ease of description, FIG. 3 shows the four contention access regions. This embodiment of the present invention is not limited thereto. More or less contention access regions may be defined according to requirements.

The application with Patent No. PCT/CN2014/073084 and entitled "System And Method For Uplink Grant-Free Transmission Scheme" provides a technical solution for uplink grant-free transmission. The application PCT/CN2014/073084 describes that a radio resource can be divided into various CTUs, and that UE is mapped to a CTU. A group of codes may be allocated to each CTU. The allocated group of codes may be a group of CDMA codes, an SCMA codebook set, an LDS sequence group, a signature (signature) group, or the like. Each code may be corresponding to a group of pilots. A user equipment may select a code and a pilot in a pilot group corresponding to the code to perform uplink transmission. It can be also understood that content of the application PCT/CN2014/073084 is incorporated by reference and is used as a part of this embodiment of the present invention. Details are not further described.

FIG. 4 is a schematic flowchart of a data transmission method 300 according to an embodiment of the present invention. As shown in FIG. 4, the method 300 includes the following steps.

310. Determine a contention transmission unit CTU to be used by to-be-sent uplink data, where the CTU is a transmission resource including at least a time domain resource, a frequency domain resource, and a code domain resource.

320. Encode the to-be-sent uplink data by using N different code element groups in the code domain resource corresponding to the determined CTU, to obtain N groups of encoded data, where N is a positive integer greater than or equal to 2.

Optionally, each group of the N different code element groups may include one or more code elements. Optionally, the encoding the to-be-sent uplink data by using N different code element groups in the code domain resource corresponding to the determined CTU, to obtain N groups of encoded data may be understood as encoding the to-be-sent uplink data by using N code elements to obtain the N groups of encoded data. The N code elements are obtained by selecting one code element from each group of the N different code element groups. Certainly, if each group of code elements includes only one code element, selection may not be required. This understanding may be applicable to other embodiments.

Optionally, each group of the N different code element groups may include one or more code elements. The encoding the to-be-sent uplink data by using N different code element groups in the code domain resource corresponding to the determined CTU, to obtain N groups of encoded data may be understood as encoding the to-be-sent uplink data by using all code elements in each code element group. Each code element in the code element group may be used to encode a portion of the to-be-sent uplink data, and all the code elements in the code element group are used to complete encoding the entire data of the to-be-sent uplink data. In this way, one group of encoded data may be obtained by using one code element group.

Optionally, that all code elements in each code element group are used to encode the to-be-sent uplink data in the foregoing may be understood as follows: When any group of the N code element groups is used for encoding, if the any code element group includes multiple code elements, the multiple code elements may be used to encode the to-be-sent uplink data to obtain a group of encoded data. When the multiple code elements are used to encode the to-be-sent uplink data, each of the multiple code elements may be used to encode a part of data of the to-be-sent uplink data.

Optionally, in this embodiment of the present invention, grouping of a code element group may be preconfigured. Alternatively, a code element group may be obtained by means of selection from all code elements corresponding to the CTU when the terminal device encodes the to-be-sent uplink data.

The foregoing optional solutions may be applicable to other embodiments, and details are not further described.

330. Send the N groups of encoded data by using the time domain and frequency domain resources that are corresponding to the determined CTU.

Therefore, in this embodiment of the present invention, a CTU to be used by to-be-sent uplink data is determined; the to-be-sent uplink data is encoded by using N different code element groups in a code domain resource corresponding to the determined CTU, to obtain N groups of encoded data; and the N groups of encoded data are sent by using time domain and frequency domain resources that are corresponding to the determined CTU. In this way, when a terminal device encodes to-be-sent uplink data by using a code domain resource, provided that a code domain resource used by one group of to-be-sent data obtained by means of encoding does not conflict with a code domain resource used by another terminal device, a receive end can correctly obtain the uplink data sent by the terminal device, thereby improving data reception reliability at the receive end.

Optionally, uplink data transmission implemented by using the foregoing data transmission method is grant-free transmission. The grant-free transmission is that a network device preallocates multiple CTUs and notifies the terminal device of the multiple CTUs, so that the terminal device selects, when the terminal device has an uplink data transmission requirement, at least one CTU from the multiple CTUs preallocated by the network device, and uses the selected CTU to send uplink data.

Optionally, in this embodiment of the present invention, each code element group included in the code domain resource may include multiple code elements or one code element.

Optionally, the code element of the code domain resource includes a sparse code multiple access SCMA codebook, a low-density signature LDS sequence, or a Code Division Multiple Access CDMA code.

Specifically, in this embodiment of the present invention, the SCMA codebook, the LDS sequence, or the CDMA code may be used as a code element of the code domain resource. It should be understood that the foregoing enumerated specific instances of code domain resources are merely examples for description. The present invention is not limited thereto. All other codebooks that can be used for transmission fall within the protection scope of the present invention.

Optionally, the SCMA codebook includes at least two code words, the codebook includes two or more code words, and the code words in the codebook may be different from each other. The codebook may represent a mapping relationship between a possible data combination of data of a specific length and a code word in the codebook. The mapping relationship may be a direct mapping relationship. The code word may be represented as a multi-dimensional complex number vector having two or more dimensions, and is used to represent a mapping relationship between data and two or more modulation symbols. The modulation symbol includes at least one zero modulation symbol and at least one non-zero modulation symbol, and the data may be binary bit data or non-binary data.

Specifically, sparse code multiple access (SCMA, Sparse Code Multiple Access) is a non-orthogonal multiple access technology. Certainly, persons skilled in the art may refer to this technology as another technical name instead of SCMA. In the technology, a codebook is used to transmit multiple different data streams on a same transmission resource. Different data streams use different codebooks, thereby improving resource utilization. The data streams may come from a same terminal device or from different terminal devices.

A codebook may represent a mapping relationship between a possible data combination of data of a specific length and a code word in the codebook. With the SCMA technology, data in a data stream is directly mapped as a code word in a codebook according to a mapping relationship, that is, a multi-dimensional complex number vector, so that the data is spread and sent on multiple resource units. The direct mapping relationship in the SCMA technology may be understood as follows: Mapping the data in the data stream as an intermediate modulation symbol is not required or another intermediate processing process is not required. The data herein may be binary bit data or non-binary data. The multiple resource units may be resource units in a time domain, a frequency domain, a space domain, a time-frequency domain, a time-space domain, or a time-frequency-space domain.

Figure 5:
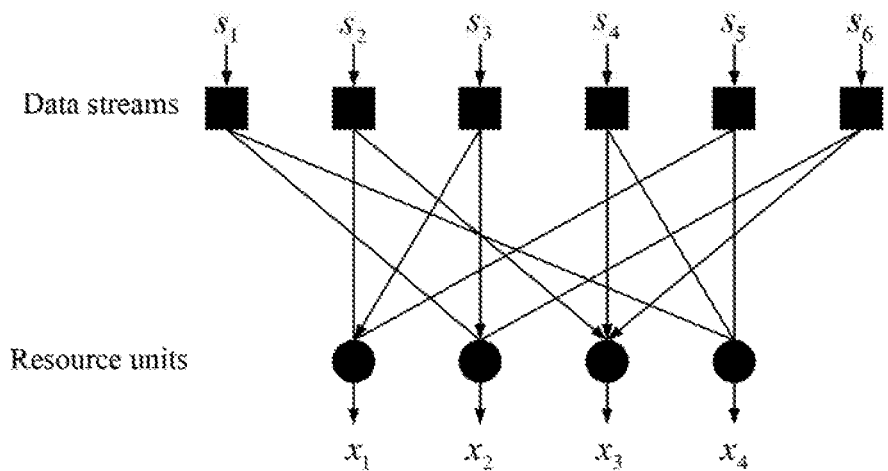
FIG. 5 is a schematic diagram of SCMA encoding according to another embodiment of the present invention.

FIG. 5 shows a schematic diagram of bit mapping processing (or referred to as encoding processing) of SCMA, and an example in which six data streams multiplex four resource units is used. Alternatively, the data streams may be referred to as variable nodes, and the resource units may be referred to as function nodes. The six data streams constitute one group, and the four resource units constitute one encoding unit. A resource unit may be a subcarrier, a resource element (English: Resource Element, "RE" for short), or an antenna port.

In the bipartite graph, a connection line between a data stream and a resource unit indicates that after code word mapping is performed on at least one data combination of the data stream, a non-zero modulation symbol is sent on the resource unit. When there is no connection line between a data stream and a resource unit, it indicates that after code word mapping is performed on all possible data combinations of the data stream, all modulation symbols sent on the resource unit are zero.

A data combination of a data stream may be understood according to the following description. For example, for a binary bit data stream, 00, 01, 10, and 11 are all possible two-bit data combinations. For ease of description, s1 to s6 in sequence represent to-be-sent data combinations of the six data streams in the bipartite graph, and x1 to x4 in sequence represent symbols that are sent on the four resource units in the bipartite graph.

It can be learned from the bipartite graph that modulation symbols are sent on two or more resource units after code word mapping is performed on data of each data stream. In addition, the symbol sent on each resource unit is superposition of modulation symbols that are obtained after code word mapping is separately performed on data of two or more data streams. For example, non-zero modulation symbols may be sent on a resource unit 1 and a resource unit 2 after code word mapping is performed on a to-be-sent data combination s3 of a data stream 3. Data x3 sent on a resource unit 3 is superposition of non-zero modulation symbols that are obtained after code word mapping is separately performed on to-be-sent data combinations s2, s4, and s6 of a data stream 2, a data stream 4, and a data stream 6. A quantity of data streams may be greater than a quantity of resource units. Therefore, the SCMA system can effectively increase a network capacity, which includes a quantity of users that can be connected to a system, spectral efficiency, and the like.

With reference to the foregoing descriptions about the codebook and the bipartite graph, a code word in the codebook may be generally in the following form:

$$\begin{pmatrix} c_{1,q} \\ c_{2,q} \\ \vdots \\ c_{N,q} \end{pmatrix};$$

and a corresponding codebook is generally in the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\}.$$

N is a positive integer greater than 1, and may represent a quantity of resource units included in one encoding unit, or may be understood as a code word length. Qm is a positive integer greater than 1, represents a quantity of code words included in the codebook, and may be referred to as a modulation order. Certainly, persons skilled in the art may refer to Qm as another name. For example, Qm is 4 in 4-order modulation. q is a positive integer, and $1 \leq q \leq Q_m$. An element $c_{n,q}$ included in the codebook and the code word is a complex number, and $c_{n,q}$ may be mathematically expressed as: $c_{n,q}=\alpha*\exp(j*\beta)$, $1 \le n \le N$, $1 \le q \le Q_m$, where $\alpha$ and $\beta$ may be any real number.

A code word in a codebook and a data combination of a data stream may form a particular mapping relationship. For example, a code word in a codebook and a two-bit data combination of a binary data stream may form the following mapping relationship:

"00" may be mapped as a code word 1, that is, $$\begin{pmatrix} c_{1,1} \\ c_{2,1} \\ \vdots \\ c_{N,1} \end{pmatrix};$$

"01" is mapped as a code word 2, that is, $$\begin{pmatrix} c_{1,2} \\ c_{2,2} \\ \vdots \\ c_{N,2} \end{pmatrix};$$

"10" is mapped as a code word 3, that is, $$\begin{pmatrix} c_{1,3} \\ c_{2,3} \\ \vdots \\ c_{N,3} \end{pmatrix};$$

and "11" is mapped as a code word 4, that is, $$\begin{pmatrix} c_{1,4} \\ c_{2,4} \\ \vdots \\ c_{N,4} \end{pmatrix}.$$

With reference to the bipartite graph, when there is a connection line between a data stream and a resource unit, a codebook corresponding to the data stream and a code word in the codebook has the following characteristic: At least one code word in the codebook is used to send a non-zero modulation symbol on the corresponding resource unit. For example, when there is a connection line between a data stream 3 and a resource unit 1, at least one code word in a codebook corresponding to the data stream 3 holds that $c_{1,q} \ne 0$, where $1 \le q \le Qm$. When there is no connection line between a data stream and a resource unit, a codebook corresponding to the data stream and a code word in the codebook has the following characteristic: All code words in the codebook are used to send a zero modulation symbol on the corresponding resource unit. For example, when there is no connection line between the data stream 3 and the resource unit 3, any code word in a codebook corresponding to the data stream 3 holds that $c_{3,q}=0$, where $1 \le q \le Qm$. In conclusion, when a modulation order is 4, the codebook corresponding to the data stream 3 in the bipartite graph may have the following form and characteristic:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

where $c_{n,q}=\alpha*\exp(j*\beta)$, $1 \le n \le 2$, $1 \le q \le 4$, $\alpha$ and $\beta$ may be any real number; for any q, $1 \le q \le 4$; $c_{1,q}$ and $c_{2,q}$ are not zeros at the same time; and at least one group of q1 and q2 holds $c_{1,q1} \ne 0$ and $c_{2,q2} \ne 0$, where $1 \le q1$ and $q2 \le 4$. For example, if the data combination s3 of the data stream 3 is "10", according to the mapping rule, this data combination is mapped as a code word, that is, a four-dimensional complex number vector:

$$\begin{pmatrix} c_{1,3} \\ c_{2,3} \\ 0 \\ 0 \end{pmatrix}.$$

Optionally, the LDS sequence is a multi-dimensional complex number vector. The multi-dimensional complex number vector includes at least one zero element and at least one non-zero element. The signature sequence is used to adjust an amplitude and a phase of a modulation symbol. The modulation symbol is obtained by performing constellation mapping on data by using a modulation constellation.

Specifically, a low-density signature (LDS, Low Density Signature) technology is also a non-orthogonal multiple access and transmission technology. Certainly, the LDS technology may be referred to as another name in the communications field. This technology is used to add O (where O is an integer not less than 1) data streams from one or more users to P (where P is an integer not less than 1) subcarriers for transmission. Data of each data stream is spread onto the P subcarriers by means of sparse spread spectrum. When a value of O is greater than that of P, this technology can effectively increase a network capacity, which includes a quantity of users that can be connected to a system, spectral efficiency, and the like. Therefore, as an important non-orthogonal access technology, the LDS technology has drawn more attentions, and become an important candidate access technology for future wireless cellular network evolution.

In a bipartite graph shown in FIG. 5, a connection line between a data stream and a resource unit indicates that, after constellation mapping and amplitude and phase adjustment are performed on at least one data combination of the data stream, a non-zero modulation symbol is sent on the resource unit. When there is no connection line between a data stream and a resource unit, it indicates that after constellation mapping and amplitude and phase adjustment are performed on all possible data combinations of the data stream, all modulation symbols sent on the resource unit are zero modulation symbols. A data combination of a data stream may be understood according to the following description. For example, for a binary bit data stream, 00, 01, 10, and 11 are all possible data combinations of two-bit data. For ease of description, s1 to s6 in sequence represent to-be-sent data combinations of the six data streams in the bipartite graph, and x1 to x4 in sequence represent modulation symbols that are sent on the four resource units in the bipartite graph.

It can be learned from the bipartite graph that modulation symbols are sent on two or more resource units after constellation mapping and amplitude and phase adjustment are performed on a data combination of each data stream. In addition, the modulation symbol sent on each resource unit is superposition of modulation symbols that are obtained after constellation mapping and amplitude and phase adjustment are performed on each of data combinations of two or more data streams. For example, non-zero modulation symbols may be sent on a resource unit 1 and a resource unit 2 after constellation mapping and amplitude and phase adjustment are performed on a to-be-sent data combination s3 of a data stream 3. A modulation symbol x3 sent on a resource unit 3 is superposition of non-zero modulation symbols that are obtained after constellation mapping and amplitude and phase adjustment are performed on each of to-be-sent data combinations s2, s4, and s6 of a data stream 2, a data stream 4, and a data stream 6. A quantity of data streams may be greater than a quantity of resource units. Therefore, the non-orthogonal multiple access system can effectively increase a network capacity, which includes a quantity of users that can be connected to a system, spectral efficiency, and the like.

Figure 6:
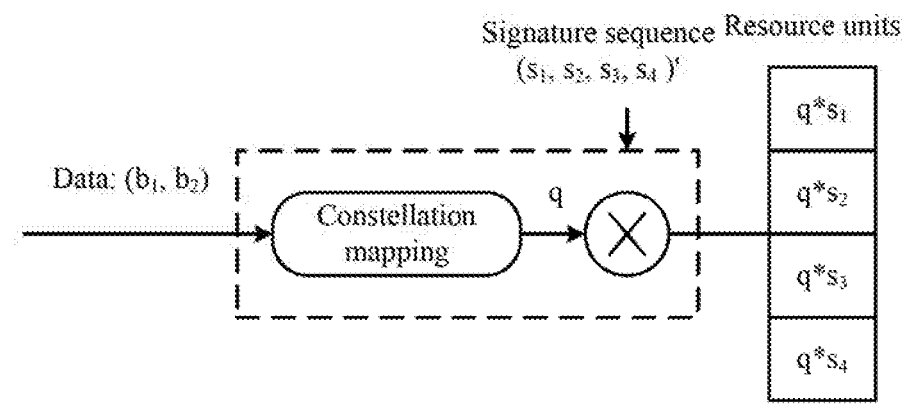
FIG. 6 is a schematic diagram of LDS mapping according to another embodiment of the present invention.

Further, as shown in FIG. 6, a modulation symbol obtained after constellation mapping is performed on data (b1, b2) of a data stream is q. After phase and amplitude adjustment is performed on the modulation symbol q by using elements in a signature sequence, that is, adjustment factors, modulation symbols sent on resource units are obtained. The modulation symbols are $q^*s_1$, $q^*s_2$, $q^*s_3$, and $q^*s_4$, respectively.

It should be understood that the foregoing enumerated SCMA codebook and LDS sequence are merely examples of code domain resources. The present invention is not limited thereto. Further, a CDMA code may be used as an example. Herein, a specific function and a using method of the CDMA code may be similar to those in the prior art. To avoid repetition, details of the specific function and the using method of the CDMA code are omitted herein.

Optionally, in this embodiment of the present invention, when encoding is performed on the to-be-sent uplink data, N different SCMA codebook sets of the CTU may be determined, and the to-be-sent data is encoded by using the N different SCMA codebook sets to obtain N groups of to-be-sent data.

Optionally, in this embodiment of the present invention, when encoding is performed on the to-be-sent uplink data, N different CDMA code groups of the CTU may be determined, and the to-be-sent data is encoded by using the N different CDMA code groups to obtain N groups of to-be-sent data.

Optionally, in this embodiment of the present invention, when encoding is performed on the to-be-sent uplink data, N different LDS sequence groups of the CTU may be determined, and the to-be-sent data is encoded by using the N different LDS sequence groups to obtain N groups of to-be-sent data.

Optionally, in this embodiment of the present invention, the to-be-sent uplink data includes a control word and a data portion. The control word is used to instruct a receive end whether to perform combined decoding on a corresponding data portion in the encoded data.

In addition to an instruction about whether to perform combined decoding, the control word may further include a terminal identifier (Identifier, ID). The terminal identifier is used to indicate a transmit end of the data portion corresponding to the control word.

Correspondingly, after the receive end decodes control word portions of all groups of transmitted data by using different code domain resources, when the receive end determines that terminal IDs in multiple control word portions are the same, and the control words instruct to perform combined channel decoding on data portions, the receive end may perform combined decoding when decoding the corresponding multiple data portions, to increase decoding reliability.

Optionally, in this embodiment of the present invention, control words included in P groups of the N groups of encoded data are used to instruct the receive end to perform combined decoding on a corresponding data portion in the encoded data. Channel encoding bit rates of data portions in the P groups of encoded data are the same. P is a positive integer greater than or equal to 2 and less than or equal to N.

That is, in only some (or all) groups of the N groups of encoded data, control words are used to instruct to perform combined decoding on corresponding data portions.

Optionally, if an element of the code domain resource included in the CTU is an SCMA codebook, that "channel encoding bit rates of data portions in the P groups of encoded data are the same" means that SCMA codebooks used for obtaining the P groups of encoded data by means of encoding have a same quantity of code words, and that lengths of the code words are the same.

Optionally, if an element of the code domain resource included in the CTU is an LDS sequence, that "channel encoding bit rates of data portions in the P groups of encoded data are the same" means that LDS sequences used for obtaining the P groups of encoded data by means of encoding have a same quantity of signature sequences, and that lengths of the signature sequences are the same.

If an element of the code domain resource included in the CTU is a CDMA code, that "channel encoding bit rates of data portions in the P groups of encoded data are the same" means that CDMA codes used for obtaining the P groups of encoded data by means of encoding have a same length.

In this embodiment of the present invention, a size of a transport block in the control word portion is usually fixed, and a relative location of a time-frequency resource that is used to send an encoded control word portion is fixed in a time-frequency resource of the entire CTU. For example, the receive end and the transmit end agree upon a fixed time-frequency resource location that is used for transmission of the control word portion.

Optionally, instruction information about whether to perform combined decoding may be indicated by using one bit. For example, 1 is used to instruct the receive end to perform combined decoding on a corresponding data portion. That is, in multiple groups of data received by the receive end, if identifiers of terminal devices are the same, and combined decoding instruction information of a control word portion in each group of data is 1, combined decoding may be performed on data portions of the multiple groups of data. For example, 0 is used to instruct the receive end not to perform combined decoding on a corresponding data portion. That is, if combined decoding instruction information of a control word portion in each group of multiple groups of data received by the receive end is 0, channel decoding may be separately performed on a data portion of each group of the multiple groups of data.

Optionally, a bit rate for performing channel encoding on the control word is less than a bit rate for performing channel encoding on the data transport block.

Optionally, in this embodiment of the present invention, bit rates for performing channel encoding for different times may be different. That is, bit rates for performing channel encoding on a control word portion for different times are different from each other, and bit rates for performing channel encoding on a data portion for different times are different from each other.

Optionally, in this embodiment of the present invention, the transmission resource constituting the CTU further includes a pilot resource. The code domain resource and the pilot resource constitute a code element-pilot combination. Pilots in different code element-pilot combinations are mutually orthogonal. Code elements in different code element-pilot combinations are different.

Correspondingly, the method may further include: sending, by using the time domain and frequency domain resources that are corresponding to the determined CTU, a pilot sequence in code element-pilot combinations corresponding to the N groups of encoded data.

Therefore, in this embodiment of the present invention, a CTU to be used by to-be-sent uplink data is determined; the to-be-sent uplink data is encoded by using N different code element groups in a code domain resource corresponding to the determined CTU, to obtain N groups of encoded data; and the N groups of encoded data are sent by using time domain and frequency domain resources that are corresponding to the determined CTU. In this way, when a terminal device encodes to-be-sent uplink data by using a code domain resource, provided that a code domain resource used by one group of to-be-sent data obtained by means of encoding does not conflict with a code domain resource used by another terminal device, a receive end can correctly obtain the uplink data sent by the terminal device, thereby improving data reception reliability at the receive end.

FIG. 7 is a schematic flowchart of a data transmission method 500 according to an embodiment of the present invention. As shown in FIG. 7, the data transmission method 500 includes the following steps:

510. Decode, by using a code domain resource of a CTU, a control word in uplink data received on a time domain resource and a frequency domain resource of the CTU, to obtain instruction information, where the CTU is a transmission resource including at least the time domain resource, the frequency domain resource, and the code domain resource, and the instruction information is used to instruct whether to perform combined decoding on a corresponding data portion.

520. Perform combined decoding on data portions of uplink data that is sent by a same terminal device and in which the control words are used to instruct to perform combined decoding on the corresponding data portions of the uplink data.

In this embodiment of the present invention, a network device may decode, on time domain and frequency domain resources of a CTU, a control word in uplink data by using a code domain resource of the CTU. The control word is used to instruct whether to perform combined decoding on a corresponding data portion. If the network device detects that instruction information in control words of multiple groups of uplink data is used to instruct to perform combined decoding on the corresponding data portions, and the multiple groups of uplink data are from a same terminal device, the network device may perform combined decoding on data portions of the multiple groups of uplink data. This can increase decoding reliability at the receive end.

Optionally, the CTU is a grant-free transmission resource. Optionally, in this embodiment of the present invention, the code domain resource may include a code element. The code element may be a CDMA code, a sparse code multiple access SCMA codebook, or a low-density signature LDS sequence.

Optionally, the SCMA codebook includes at least two code words, the codebook includes two or more code words, and the code words in the codebook may be different from each other. The codebook may represent a mapping relationship between a possible data combination of data of a specific length and a code word in the codebook. The mapping relationship may be a direct mapping relationship. The code word may be represented as a multi-dimensional complex number vector having two or more dimensions, and is used to represent a mapping relationship between data and two or more modulation symbols. The modulation symbol includes at least one zero modulation symbol and at least one non-zero modulation symbol, and the data may be binary bit data or non-binary data.

Optionally, the LDS sequence is a multi-dimensional complex number vector. The multi-dimensional vector includes at least one zero element and at least one non-zero element. The LDS sequence is used to adjust an amplitude and a phase of a modulation symbol. The modulation symbol is obtained by performing constellation mapping on data by using a modulation constellation.

Optionally, in this embodiment of the present invention, the transmission resource further includes a pilot resource. A code element in the code domain resource and a pilot in the pilot resource constitute a code element-pilot combination. Pilots in different code element-pilot combinations are mutually orthogonal. Code elements in code element groups in different code element-pilot combinations are different.

Before the decoding a control word in uplink data by using a code element of the CTU to obtain instruction information, the method further includes: performing, on the time domain resource and the frequency domain resource of the CTU, blind detection of a pilot in a code element-pilot combination.

The decoding a control word in uplink data by using a code element of the CTU includes:

decoding the control word in the uplink data by using code elements in code element-pilot combinations corresponding to a pilot sequence obtained by means of blind detection, to obtain the instruction information.

In this embodiment of the present invention, a size of a transport block in the control word portion is usually fixed, and a relative location of a time-frequency resource that is used to send an encoded control word portion is fixed in a time-frequency resource of the entire CTU. For example, the receive end and the transmit end agree upon a fixed time-frequency resource location that is used for transmission of the control word portion.

Optionally, instruction information about whether to perform combined decoding may be indicated by using one bit. For example, 1 is used to instruct the receive end to perform combined decoding on a corresponding data portion. That is, in multiple groups of data received by the receive end, if identifiers of terminal devices are the same, and combined decoding instruction information of a control word portion in each group of data is 1, combined decoding may be performed on data portions of the multiple groups of data. For example, 0 is used to instruct the receive end not to perform combined decoding on a corresponding data portion. That is, if combined decoding instruction information of a control word portion in each group of multiple groups of data received by the receive end is 0, channel decoding may be separately performed on a data portion of each group of the multiple groups of data.

Therefore, in this embodiment of the present invention, a terminal device determines a CTU to be used by to-be-sent uplink data; encodes the to-be-sent uplink data by using N different code element groups corresponding to the determined CTU, to obtain N groups of encoded data; and sends the N groups of encoded data by using time domain and frequency domain resources that are corresponding to the determined CTU. In this way, when the terminal device encodes the to-be-sent uplink data by using a code domain resource, provided that a code domain resource used by one group of uplink data obtained by means of encoding does not conflict with a code domain resource used by another terminal device, a receive end can correctly obtain the uplink data sent by the terminal device, thereby improving data reception reliability at the receive end. In addition, the terminal device may add a combined decoding instruction to control words of the N groups of to-be-sent uplink data. When decoding control words of multiple groups of uplink data, the receive end may perform combined decoding on data portions of the multiple groups of uplink data.

FIG. 8 is a schematic flowchart of a data transmission method 600 according to an embodiment of the present invention. As shown in FIG. 8, the method 600 includes the following steps.

610. Determine a CTU to be used by to-be-sent uplink data, where the CTU is a transmission resource including at least a time domain resource, a frequency domain resource, a code domain resource, and a pilot resource, a code element of the code domain resource and the pilot resource constitute a code element-pilot combination, and pilots in different code element-pilot combinations are mutually orthogonal.

620. Encode the to-be-sent uplink data by using code elements in N different code element-pilot combinations in the transmission resource corresponding to the determined CTU, to obtain N groups of encoded data, where N is a positive integer greater than or equal to 2.

Optionally, the code element in the N different code element-pilot combinations may include one or more code elements. Optionally, the encoding the to-be-sent uplink data by using code elements in N different code element-pilot combinations in the transmission resource corresponding to the determined CTU, to obtain N groups of encoded data may be understood as encoding the to-be-sent uplink data by using N code elements to obtain the N groups of encoded data. The N code elements are obtained by selecting one code element from code elements of each of the N different code element-pilot combinations. Certainly, if each of the N code element-pilot combinations includes only one code element, selection may not be required. This understanding may be applicable to other embodiments.

630. Send, by using the time domain and frequency domain resources that are corresponding to the determined CTU, the N groups of encoded data and pilots in the N code element-pilot combinations.

In this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent uplink data. When decoding control words of multiple groups of transmitted data, the receive end may perform combined decoding on data portions of the multiple groups of transmitted data.

Optionally, uplink data transmission implemented by using the foregoing data transmission method is grant-free transmission. The grant-free transmission is that a network device preallocates multiple CTUs and notifies the terminal device of the multiple CTUs, so that the terminal device selects, when the terminal device has an uplink data transmission requirement, at least one CTU from the multiple CTUs preallocated by the network device, and uses the selected CTU to send uplink data.

Optionally, each of the N different code element-pilot combinations may include one or more code elements. Optionally, the encoding the to-be-sent uplink data by using N different code element-pilot combinations corresponding to the determined CTU, to obtain N groups of encoded data may be understood as encoding the to-be-sent uplink data by using N code elements to obtain the N groups of encoded data. The N code elements are obtained by selecting one code element from each of the N different code element-pilot combinations. Certainly, if each code element-pilot combination group includes only one code element, selection may not be required. This understanding may be applicable to other embodiments.

Optionally, each of the N different code element-pilot combinations may include one or more code elements. The encoding the to-be-sent uplink data by using N different code element-pilot combinations corresponding to the determined CTU to obtain the N groups of encoded data may be understood as encoding the to-be-sent uplink data by using all code elements in each code element-pilot combination. Each code element in each code element-pilot combination may be used to encode only a part of data of the to-be-sent uplink data, and all code elements in each code element-pilot combination are used to complete encoding the entire data of the to-be-sent uplink data. In this way, the code elements in one code element-pilot combination may be used to obtain one group of encoded data.

Optionally, the encoding the to-be-sent uplink data by using all code elements in each code element-pilot combination may be understood as follows: When a code element in any of the N code element-pilot combinations is used for encoding, if the any combination includes multiple code elements, the multiple code elements may be used to encode the to-be-sent uplink data to obtain one group of encoded data. When the multiple code elements are used to encode the to-be-sent uplink data, each of the multiple code elements may be used to encode a part of data of the to-be-sent uplink data.

The foregoing optional solutions may be applicable to other embodiments, and details are not further described.

Optionally, the code element of the grant-free code domain resource includes a sparse code division multiple access SCMA codebook, a low-density signature LDS sequence, or a Code Division Multiple Access CDMA code.

Optionally, the SCMA codebook includes at least two code words, the codebook includes two or more code words, and the code words in the codebook may be different from each other. The codebook may represent a mapping relationship between a possible data combination of data of a specific length and a code word in the codebook. The mapping relationship may be a direct mapping relationship.

The code word may be represented as a multi-dimensional complex number vector having two or more dimensions, and is used to represent a mapping relationship between data and two or more modulation symbols. The modulation symbol includes at least one zero modulation symbol and at least one non-zero modulation symbol, and the data may be binary bit data or non-binary data.

Optionally, the LDS sequence is a multi-dimensional complex number vector. The multi-dimensional vector includes at least one zero element and at least one non-zero element. The LDS sequence is used to adjust an amplitude and a phase of a modulation symbol. The modulation symbol is obtained by performing constellation mapping on data by using a modulation constellation.

Optionally, in this embodiment of the present invention, the to-be-sent uplink data includes a control word and a data portion. The control word is used to instruct a receive end whether to perform combined decoding on a corresponding data portion in the encoded data.

In addition to an instruction about whether to perform combined decoding, the control word may further include a terminal identifier (Identifier, ID). The terminal identifier is used to indicate a transmit end of the data portion corresponding to the control word.

Correspondingly, after the receive end decodes control words of all groups of transmitted data by using code elements in different code element-pilot combinations, when the receive end determines that terminal IDs in multiple control words are the same, and the control words instruct to perform combined decoding on data portions, the receive end may perform combined decoding when decoding the corresponding multiple data portions, to increase decoding reliability.

Optionally, in this embodiment of the present invention, control words included in P groups of the N groups of encoded data are used to instruct the receive end to perform combined decoding on a corresponding data portion in the encoded data. Bit rates of data portions in the P groups of encoded data obtained by means of encoding are the same. P is a positive integer greater than or equal to 2 and less than or equal to N.

That is, in only some (or all) groups of the N groups of encoded data, control words are used to perform combined decoding on corresponding data portions.

Optionally, if the code domain resource included in the CTU is an SCMA codebook, that "channel encoding bit rates of data portions in the P groups of encoded data are the same" means that SCMA codebooks used for obtaining the P groups of encoded data by means of encoding have a same quantity of code words, and that lengths of the code words are the same.

Optionally, if the code domain resource element included in the CTU is an LDS sequence, that "channel encoding bit rates of data portions in the P groups of encoded data are the same" means that LDS sequences used for obtaining the P groups of encoded data by means of encoding have a same quantity of signature sequences, and that lengths of the signature sequences are the same.

If the code domain resource element included in the CTU is a CDMA code, that "channel encoding bit rates of data portions in the P groups of encoded data are the same" means that CDMA codes used for obtaining the P groups of encoded data by means of encoding have a same length.

In this embodiment of the present invention, a size of a transport block in the control word portion is usually fixed, and a relative location of a time-frequency resource that is used to send an encoded control word portion is fixed in a time-frequency resource of the entire CTU. For example, the receive end and the transmit end agree upon a fixed time-frequency resource location that is used for transmission of the control word portion.

Optionally, instruction information about whether to perform combined decoding may be indicated by using one bit. For example, 1 is used to instruct the receive end to perform combined decoding on a corresponding data portion. That is, in multiple groups of data received by the receive end, if identifiers of terminal devices are the same, and combined decoding instruction information of a control word portion in each group of data is 1, combined decoding may be performed on data portions of the multiple groups of data. For example, 0 is used to instruct the receive end not to perform combined decoding on a corresponding data portion. That is, if combined decoding instruction information of a control word portion in each group of multiple groups of data received by the receive end is 0, channel decoding may be separately performed on a data portion of each group of the multiple groups of data.

Optionally, a bit rate for performing channel encoding on the control word is less than a bit rate for performing channel encoding on the data transport block.

Optionally, in this embodiment of the present invention, bit rates for performing channel encoding for different times may be different. That is, bit rates for performing channel encoding on a control word portion for different times are different from each other, and bit rates for performing channel encoding on a data portion for different times are different from each other.

Optionally, in this embodiment of the present invention, code elements in all or some code element-pilot combinations included in the CTU may be the same.

Optionally, in this embodiment of the present invention, the code element-pilot combination includes at least one code element and one pilot.

Therefore, in this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent data. When decoding control words of multiple groups of transmitted data, the receive end may perform combined decoding on data portions of the multiple groups of transmitted data.

FIG. 9 is a schematic flowchart of a data transmission method 700 according to an embodiment of the present invention. As shown in FIG. 9, the method 700 includes the following steps:

710. Perform, on a time domain resource and a frequency domain resource of a CTU, blind detection of a pilot in a code element-pilot combination, where the CTU is a transmission resource including at least the time domain resource, the frequency domain resource, a code domain resource, and a pilot resource, a code element of the code domain resource and the pilot resource constitute a code element-pilot combination, and pilots in different code element-pilot combinations are mutually orthogonal.

720. Decode, by using code elements in code element-pilot combinations corresponding to a pilot sequence obtained by means of blind detection, a control word in uplink data received on the CTU, to obtain instruction information, where the instruction information is used to instruct whether to perform combined decoding on a corresponding data portion.

730. Perform combined decoding on data portions of uplink data that is sent by a same terminal device and in which the instruction information is used to instruct to perform combined decoding on the corresponding data portions of the uplink data.

In this embodiment of the present invention, a network device performs, on time domain and frequency domain resources of a CTU, blind detection of a pilot in a code element-pilot combination; and decodes by using code elements in code element-pilot combinations corresponding to a pilot sequence obtained by means of blind detection, a control word in uplink data. The control word is used to instruct whether to perform combined decoding on a corresponding data portion. If the network device detects that control words of multiple groups of uplink data are used to instruct to perform combined decoding on corresponding data portions, and the multiple groups of uplink data are from a same terminal device, the network device may perform combined decoding on the data portions of the multiple groups of uplink data. This can further increase channel decoding reliability.

Optionally, the CTU is a grant-free transmission resource. Optionally, in this embodiment of the present invention, the code element is a CDMA code, a sparse code multiple access SCMA codebook, or a low-density signature LDS sequence.

The SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

The LDS sequence is a multi-dimensional complex number vector. The multi-dimensional vector includes at least one zero element and at least one non-zero element. The LDS sequence is used to adjust an amplitude and a phase of a modulation symbol. The modulation symbol is obtained by performing constellation mapping on data by using a modulation constellation.

Optionally, in this embodiment of the present invention, the transmission resource further includes the pilot resource. A code element of the code domain resource and the pilot resource constitute a code element-pilot combination. Pilots in different code element-pilot combinations are mutually orthogonal. Code elements in different code element-pilot combinations are different.

Before the decoding a control word in uplink data by using a code element of the CTU to obtain instruction information, the method further includes: performing, on the time domain resource and the frequency domain resource of the CTU, blind detection of a pilot in a code element-pilot combination.

The decoding a control word in uplink data by using a code domain resource of the CTU includes:

decoding the control word in the uplink data by using code elements in code element-pilot combinations corresponding to a pilot sequence obtained by means of blind detection, to obtain the instruction information.

In this embodiment of the present invention, a size of a transport block in the control word portion is usually fixed, and a relative location of a time-frequency resource that is used to send an encoded control word portion is fixed in a time-frequency resource of the entire CTU. For example, the receive end and the transmit end agree upon a fixed time-frequency resource location that is used for transmission of the control word portion.

Optionally, instruction information about whether to perform combined decoding may be indicated by using one bit. For example, 1 is used to instruct the receive end to perform combined decoding on a corresponding data portion. That is, in multiple groups of data received by the receive end, if identifiers of terminal devices are the same, and combined decoding instruction information of a control word portion in each group of data is 1, combined decoding may be performed on data portions of the multiple groups of data. For example, 0 is used to instruct the receive end not to perform combined decoding on a corresponding data portion. That is, if combined decoding instruction information of a control word portion in each group of multiple groups of data received by the receive end is 0, channel decoding may be separately performed on a data portion of each group of the multiple groups of data.

Optionally, in this embodiment of the present invention, the code element-pilot combination includes at least one code element and one pilot. For example, the code element-pilot combination may include one code element and one pilot, or multiple code elements and one pilot. "Multiple" in the present invention may be understood as two or more.

Therefore, in this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent uplink data. When decoding control words of multiple groups of uplink data, the receive end may perform combined decoding on data portions of the multiple groups of uplink data.

Figure 10:
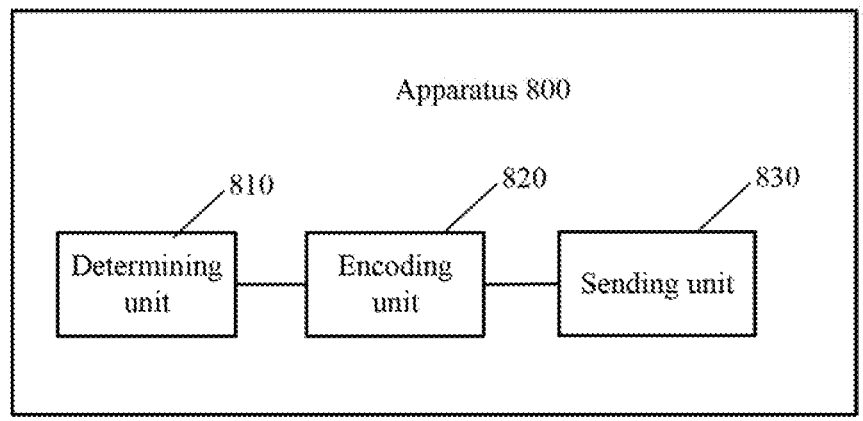
FIG. 10 is a schematic block diagram of a data transmission apparatus according to another embodiment of the present invention.

FIG. 10 is a schematic block diagram of a data transmission apparatus 800 according to an embodiment of the present invention. The data transmission apparatus 800 includes:

a determining unit 810, configured to determine a contention transmission unit CTU to be used by to-be-sent uplink data, where the CTU is a transmission resource including at least a time domain resource, a frequency domain resource, and a code domain resource;

an encoding unit 820, configured to encode the to-be-sent uplink data by using N different code element groups in the code domain resource corresponding to the CTU determined by the determining unit 810, to obtain N groups of encoded data, where N is a positive integer greater than or equal to 2; and a sending unit 830, configured to send the N groups of encoded data by using the time domain and frequency domain resources that are corresponding to the CTU determined by the determining unit 810.

Optionally, each group of the N groups of encoded data includes a control word and a data portion. The control word is used to instruct a receive end whether to perform combined decoding on a corresponding data portion in the encoded data.

Optionally, control words included in P groups of the N groups of encoded data are used to instruct the receive end to perform combined decoding on a corresponding data portion in the encoded data. Channel encoding bit rates of data portions in the P groups of encoded data are the same. P is a positive integer greater than or equal to 2 and less than or equal to N.

Optionally, a bit rate for performing channel encoding on the control word by the encoding unit 820 is less than a bit rate for performing channel encoding on the data portion in the to-be-sent uplink data.

Optionally, a code element in the code domain resource is a Code Division Multiple Access CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, the transmission resource further includes a pilot resource. A code element of the code domain resource and the pilot resource constitute a code element-pilot combination. Pilots in different code element-pilot combinations are mutually orthogonal. Code elements in code element groups in different code element-pilot combinations are different.

Optionally, the sending unit 830 is further configured to:

send, by using the time domain and frequency domain resources that are corresponding to the determined CTU, a pilot sequence in code element-pilot combinations corresponding to the N groups of encoded data.

Optionally, the CTU is a grant-free transmission resource.

Optionally, the apparatus 800 is a terminal device.

It should be understood that the apparatus 800 may be corresponding to the terminal device in the method 300, and can implement corresponding functions thereof. For brevity, details are not further described herein.

Therefore, in this embodiment of the present invention, a CTU to be used by to-be-sent uplink data is determined; the to-be-sent uplink data is encoded by using N different code element groups in a code domain resource corresponding to the determined CTU, to obtain N groups of encoded data; and the N groups of encoded data are sent by using time domain and frequency domain resources that are corresponding to the determined CTU. In this way, when a terminal device encodes to-be-sent uplink data by using a code domain resource, provided that a code domain resource used by one group of to-be-sent data obtained by means of encoding does not conflict with a code domain resource used by another terminal device, a receive end can correctly obtain the uplink data sent by the terminal device, thereby improving data reception reliability at the receive end.

Figure 11:
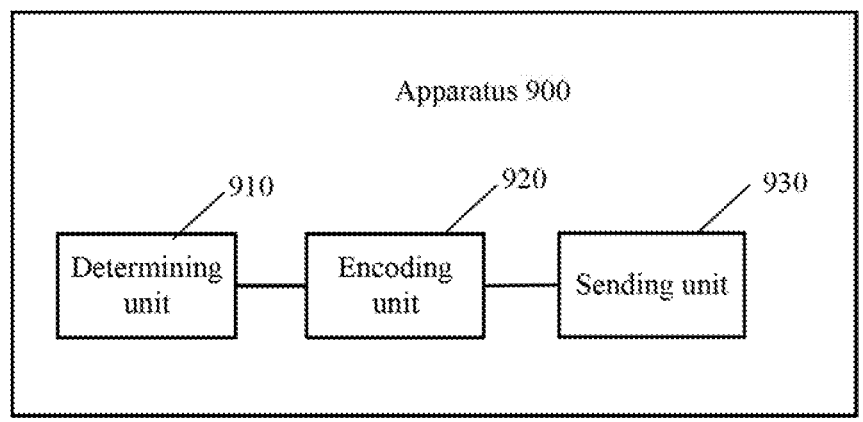
FIG. 11 is a schematic block diagram of a data transmission apparatus according to another embodiment of the present invention.

FIG. 11 is a schematic block diagram of a data transmission apparatus 900 according to an embodiment of the present invention. As shown in FIG. 11, the apparatus 900 includes:

a determining unit 910, configured to determine a contention transmission unit CTU to be used by to-be-sent uplink data, where the CTU is a transmission resource including at least a time domain resource, a frequency domain resource, a code domain resource, and a pilot resource, a code element of the code domain resource and the pilot resource constitute a code element-pilot combination, and pilots in different code element-pilot combinations are mutually orthogonal;

an encoding unit 920, configured to encode the to-be-sent uplink data by using code elements in N different code element-pilot combinations in a transmission resource corresponding to the CTU determined by the determining unit 910, to obtain N groups of encoded data, where N is a positive integer greater than or equal to 2; and a sending unit 930, configured to send, by using the time domain and frequency domain resources that are corresponding to the CTU determined by the determining unit 910, the N groups of encoded data and pilots in the N code element-pilot combinations.

Optionally, each group of the N groups of encoded data includes a control word. The control word is used to instruct a receive end whether to perform combined decoding on a corresponding data portion in the encoded data.

Optionally, control words included in P groups of the N groups of encoded data are used to instruct the receive end to perform combined decoding on a corresponding data portion in the encoded data. Channel encoding bit rates of data portions in the P groups of encoded data are the same.

Optionally, a bit rate for performing channel encoding on the control word by the encoding unit 920 is less than a bit rate for performing channel encoding on the data portion in the to-be-sent uplink data.

Optionally, the code element is a CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, code elements in all or some code element-pilot combinations included in the CTU are the same.

Optionally, the CTU is a grant-free transmission resource.

Optionally, the code element-pilot combination includes at least one code element and one pilot.

Optionally, the apparatus 900 is a terminal device.

It should be understood that the apparatus 900 may be corresponding to the terminal device in the method 600, and can implement corresponding functions thereof. For brevity, details are not further described herein.

In this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent data. When decoding control words of multiple groups of transmitted data, the receive end may perform combined decoding on data portions of the multiple groups of transmitted data.

Figure 12:
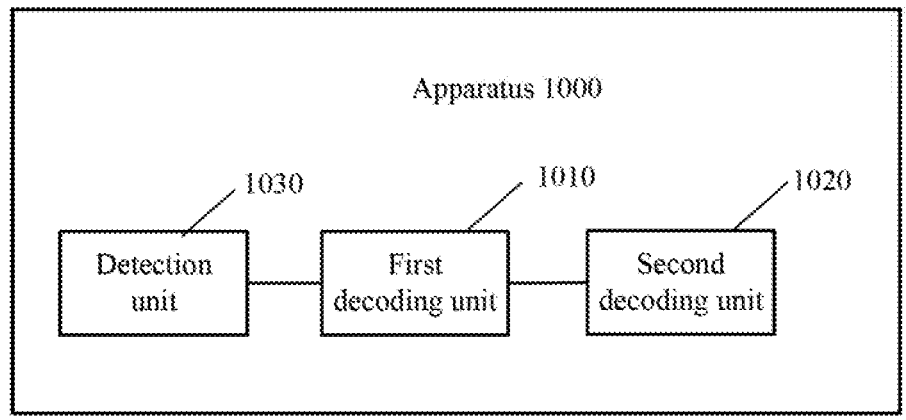
FIG. 12 is a schematic block diagram of a data transmission apparatus according to another embodiment of the present invention.

FIG. 12 is a schematic block diagram of a data transmission apparatus 1000 according to an embodiment of the present invention. As shown in FIG. 12, the apparatus 1000 includes:

a first decoding unit 1010, configured to decode, by using a code element of a code domain resource of a contention transmission unit CTU, a control word in uplink data received on time domain and frequency domain resources of the CTU, to obtain instruction information, where the CTU is a transmission resource including at least the time domain resource, the frequency domain resource, and the code domain resource, and the instruction information is used to instruct whether to perform combined decoding on a corresponding data portion; and a second decoding unit 1020, configured to perform combined decoding on data portions of uplink data that is sent by a same terminal device and in which the instruction information instructs to perform combined decoding on the corresponding data portions of the uplink data.

Optionally, the code element is a CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, the transmission resource further includes a pilot resource. A code element of the code domain resource and the pilot resource constitute a code element-pilot combination. Pilots in different code element-pilot combinations are mutually orthogonal. Code elements in different code element-pilot combinations are different.

Before the decoding a control word in uplink data by using a code element of the CTU to obtain instruction information, the apparatus 1000 further includes a detection unit 1030, configured to perform, on the time domain resource and the frequency domain resource of the CTU, blind detection of a pilot in a code element-pilot combination.

The first decoding unit 1010 is specifically configured to: decode the control word in the uplink data by using code elements in code element-pilot combinations corresponding to a pilot sequence obtained by means of blind detection, to obtain the instruction information.

Optionally, the CTU is a grant-free transmission resource.

Optionally, the apparatus 1000 is a network device.

It should be understood that the apparatus 1000 may be corresponding to the network device in the method 500, and can implement corresponding functions thereof. For brevity, details are not further described herein.

In this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent data. When decoding control words of multiple groups of transmitted data, the receive end may perform combined decoding on data portions of the multiple groups of transmitted data.

Figure 13:
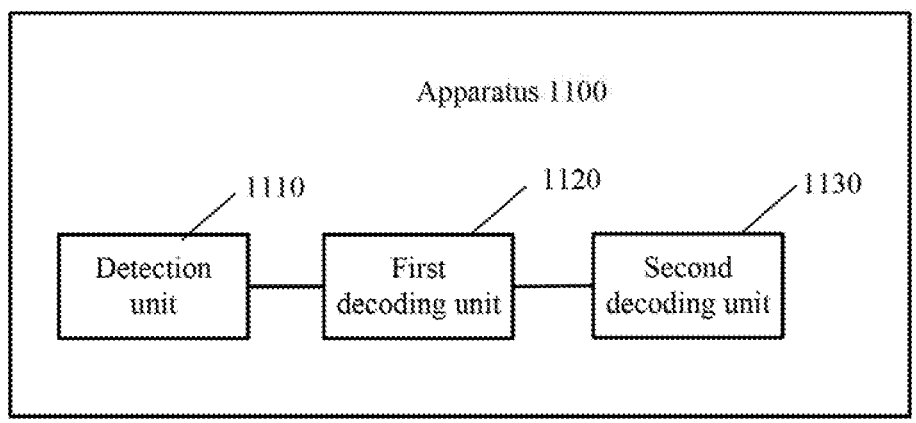
FIG. 13 is a schematic block diagram of a data transmission apparatus according to another embodiment of the present invention.

FIG. 13 is a schematic block diagram of a data transmission apparatus 1100 according to an embodiment of the present invention. As shown in FIG. 13, the apparatus 1100 includes:

a detection unit 1100, configured to perform, on time domain and frequency domain resources of a contention transmission unit CTU, blind detection of a pilot in a code element-pilot combination, where the CTU is a transmission resource including at least the time domain resource, the frequency domain resource, a code domain resource, and a pilot resource, a code element of the code domain resource and the pilot resource constitute a code element-pilot combination, and pilots in different code element-pilot combinations are mutually orthogonal;

a first decoding unit 1120, configured to decode, by using code elements in code element-pilot combinations corresponding to a pilot sequence obtained by means of blind detection by the detection unit 1100, a control word in uplink data received on the time domain and frequency domain resources of the CTU, to obtain instruction information, where the instruction information is used to instruct whether to perform combined decoding on a corresponding data portion; and a second decoding unit 1130, configured to perform combined decoding on data portions of uplink data that is sent by a same terminal device and in which the instruction information instructs to perform combined decoding on the corresponding data portions of the uplink data.

Optionally, the code element is a CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, code elements in all or some code element-pilot combinations included in the CTU are the same.

Optionally, the CTU is a grant-free transmission resource.

Optionally, the code element-pilot combination includes at least one code element and one pilot.

Optionally, the apparatus 1100 is a network device.

It should be understood that the apparatus 1100 may be corresponding to the network device in the method 700, and can implement corresponding functions thereof. For brevity, details are not further described herein.

In this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent data. When decoding control words of multiple groups of transmitted data, the receive end may perform combined decoding on data portions of the multiple groups of transmitted data.

Figure 14:
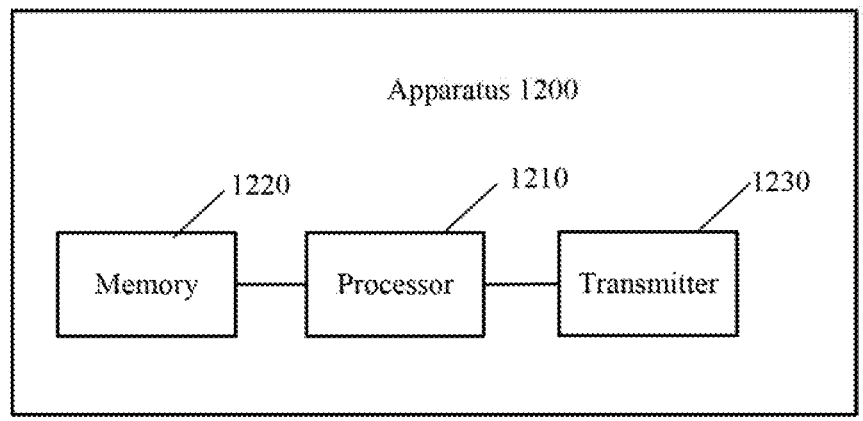
FIG. 14 is a schematic block diagram of a data transmission apparatus according to another embodiment of the present invention.

FIG. 14 is a schematic block diagram of a data transmission apparatus 1200 according to an embodiment of the present invention. As shown in FIG. 14, the apparatus 1200 includes a processor 1210 and a transmitter 1230.

The processor 1210 is configured to: determine a contention transmission unit CTU to be used by to-be-sent uplink data, where the CTU is a transmission resource including at least a time domain resource, a frequency domain resource, and a code domain resource; and encode the to-be-sent uplink data by using N different code element groups in the code domain resource corresponding to the determined CTU, to obtain N groups of encoded data, where N is a positive integer greater than or equal to 2.

The transmitter 1230 is configured to send the N groups of encoded data by using the time domain and frequency domain resources that are corresponding to the determined CTU.

Optionally, each group of the N groups of encoded data includes a control word and a data portion. The control word is used to instruct a receive end whether to perform combined decoding on a corresponding data portion in the encoded data.

Optionally, control words included in P groups of the N groups of encoded data are used to instruct the receive end to perform combined decoding on a corresponding data portion in the encoded data. Channel encoding bit rates of data portions in the P groups of encoded data are the same. P is a positive integer greater than or equal to 2 and less than or equal to N.

Optionally, a bit rate for performing channel encoding on the control word is less than a bit rate for performing channel encoding on the data portion in the to-be-sent uplink data.

Optionally, a code element in the code domain resource is a Code Division Multiple Access CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, the transmission resource further includes a pilot resource. A code element of the code domain resource and the pilot resource constitute a code element-pilot combination. Pilots in different code element-pilot combinations are mutually orthogonal. Code elements in code element groups in different code element-pilot combinations are different.

Optionally, the transmitter 1230 is further configured to: send, by using the time domain and frequency domain resources that are corresponding to the CTU determined by the processor 1210, a pilot sequence in code element-pilot combinations corresponding to the N groups of encoded data.

Optionally, the CTU is a grant-free transmission resource. The apparatus 1200 is a terminal device.

In this embodiment of the present invention, in addition to the processor 1210 and the transmitter 1230, the apparatus 1200 may further include another part, for example, a memory 1220. The memory 1220 is configured to store corresponding code, and the processor 1210 calls the code to execute a corresponding operation.

Optionally, the processor 1210, the memory 1220, and the transmitter 1230 may be connected to each other by using a bus.

It should be understood that the apparatus 1200 may be corresponding to the terminal device in the method 300, and can implement corresponding functions thereof. For brevity, details are not further described herein.

Therefore, in this embodiment of the present invention, a terminal device determines a CTU to be used by to-be-sent uplink data; encodes the to-be-sent uplink data by using N different code element groups corresponding to the determined CTU, to obtain N groups of encoded data; and sends the N groups of encoded data by using time domain and frequency domain resources that are corresponding to the determined CTU. In this way, when the terminal device encodes the to-be-sent uplink data by using a code domain resource, provided that a code domain resource used by one group of uplink data obtained by means of encoding does not conflict with a code domain resource used by another terminal device, a receive end can correctly obtain the uplink data sent by the terminal device, thereby improving data reception reliability at the receive end. In addition, the terminal device may add a combined decoding instruction to control words of the N groups of to-be-sent uplink data. When decoding control words of multiple groups of uplink data, the receive end may perform combined decoding on data portions of the multiple groups of uplink data.

Figure 15:
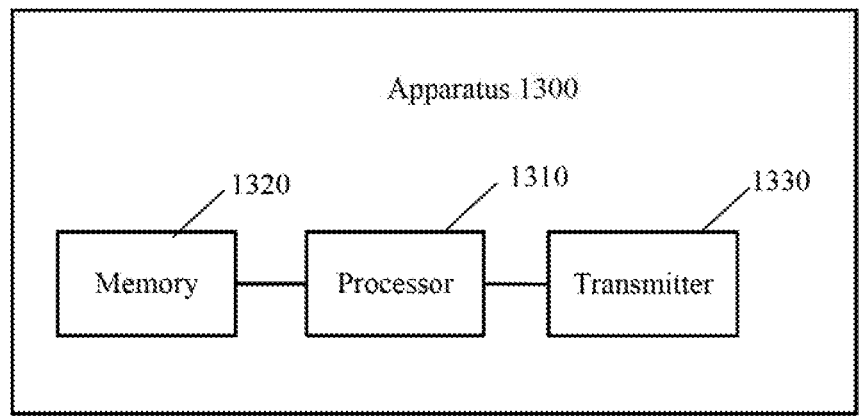
FIG. 15 is a schematic block diagram of a data transmission apparatus according to another embodiment of the present invention.

FIG. 15 is a schematic block diagram of a data transmission apparatus 1300 according to an embodiment of the present invention. As shown in FIG. 15, the apparatus 1300 includes a processor 1310 and a transmitter 1330.

The processor 1310 is configured to: determine a contention transmission unit CTU to be used by to-be-sent uplink data, where the CTU is a transmission resource including at least a time domain resource, a frequency domain resource, a code domain resource, and a pilot resource, a code element of the code domain resource and the pilot resource constitute a code element-pilot combination, and pilots in different code element-pilot combinations are mutually orthogonal; and encode the to-be-sent uplink data by using code elements in N different code element-pilot combinations in the transmission resource corresponding to the determined CTU, to obtain N groups of encoded data, where N is a positive integer greater than or equal to 2.

The transmitter 1330 is configured to send, by using the time domain and frequency domain resources that are corresponding to the determined CTU, the N groups of encoded data and pilots in the N code element-pilot combinations.

Optionally, each group of the N groups of encoded data includes a control word. The control word is used to instruct a receive end whether to perform combined decoding on a corresponding data portion in the encoded data.

Optionally, control words included in P groups of the N groups of encoded data are used to instruct the receive end to perform combined decoding on a corresponding data portion in the encoded data. Channel encoding bit rates of data portions in the P groups of encoded data are the same.

Optionally, a bit rate for performing channel encoding on the control word is less than a bit rate for performing channel encoding on the data portion in the to-be-sent uplink data.

Optionally, the code element is a CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, code elements in all or some code element-pilot combinations included in the CTU are the same.

Optionally, the CTU is a grant-free transmission resource. Optionally, the code element-pilot combination includes at least one code element and one pilot.

Optionally, the apparatus 1300 is a terminal device.

In this embodiment of the present invention, in addition to the processor 1310 and the transmitter 1330, the apparatus 1300 may further include another part, for example, a memory 1320. The memory 1320 is configured to store corresponding code, and the processor 1310 calls the code to execute a corresponding operation.

Optionally, the processor 1310, the memory 1320, and the transmitter 1330 may be connected to each other by using a bus.

It should be understood that the apparatus 1300 may be corresponding to the terminal device in the method 600, and can implement corresponding functions thereof. For brevity, details are not further described herein.

Therefore, in this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent data. When decoding control words of multiple groups of transmitted data, the receive end may perform combined decoding on data portions of the multiple groups of transmitted data.

Figure 16:
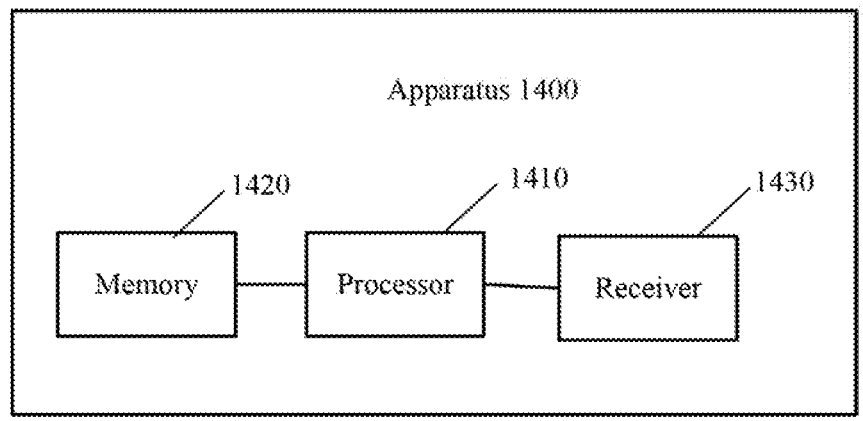
FIG. 16 is a schematic block diagram of a data transmission apparatus according to another embodiment of the present invention.

FIG. 16 is a schematic block diagram of a data transmission apparatus 1400 according to an embodiment of the present invention. As shown in FIG. 16, the apparatus 1400 includes a processor 1410 and a receiver 1430.

The receiver 1430 is configured to receive a control word in uplink data on time domain and frequency domain resources of a CTU. The CTU is a transmission resource including at least the time domain resource, the frequency domain resource, and a code domain resource.

The processor 1410 is configured to: perform decoding by using a code element of the code domain resource of the contention transmission unit CTU, to obtain instruction information, where the instruction information is used to instruct whether to perform combined decoding on a corresponding data portion; and perform combined decoding on data portions of uplink data that is sent by a same terminal device and in which the instruction information instructs to perform combined decoding on the corresponding data portions of the uplink data.

Optionally, the code element is a CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, the transmission resource further includes a pilot resource. A code element of the code domain resource and the pilot resource constitute a code element-pilot combination. Pilots in different code element-pilot combinations are mutually orthogonal. Code elements in different code element-pilot combinations are different.

The receiver 1430 is further configured to:

before the processor 1410 decodes a control word in uplink data by using a code element of the CTU to obtain the instruction information, perform, on the time domain resource and the frequency domain resource of the CTU, blind detection of a pilot in a code element-pilot combination.

The processor 1410 is configured to decode the control word in the uplink data by using code elements in code element-pilot combinations corresponding to a pilot sequence obtained by means of blind detection, to obtain the instruction information.

Optionally, the CTU is a grant-free transmission resource. Optionally, the apparatus 1400 is a network device.

In this embodiment of the present invention, in addition to the processor 1410 and the receiver 1430, the apparatus 1400 may further include another part, for example, a memory 1420. The memory 1420 is configured to store corresponding code, and the processor 1410 calls the code to execute a corresponding operation.

Optionally, the processor 1410, the memory 1420, and the transmitter 1430 may be connected to each other by using a bus.

It should be understood that the apparatus 1400 may be corresponding to the network device in the method 500, and can implement corresponding functions thereof. For brevity, details are not further described herein.

Therefore, in this embodiment of the present invention, a terminal device determines a CTU to be used by to-be-sent uplink data; encodes the to-be-sent uplink data by using N different code element groups corresponding to the determined CTU, to obtain N groups of encoded data; and sends the N groups of encoded data by using time domain and frequency domain resources that are corresponding to the determined CTU. In this way, when the terminal device encodes the to-be-sent uplink data by using a code domain resource, provided that a code domain resource used by one group of uplink data obtained by means of encoding does not conflict with a code domain resource used by another terminal device, a receive end can correctly obtain the uplink data sent by the terminal device, thereby improving data reception reliability at the receive end. In addition, the terminal device may add a combined decoding instruction to control words of the N groups of to-be-sent uplink data. When decoding control words of multiple groups of uplink data, the receive end may perform combined decoding on data portions of the multiple groups of uplink data.

Figure 17:
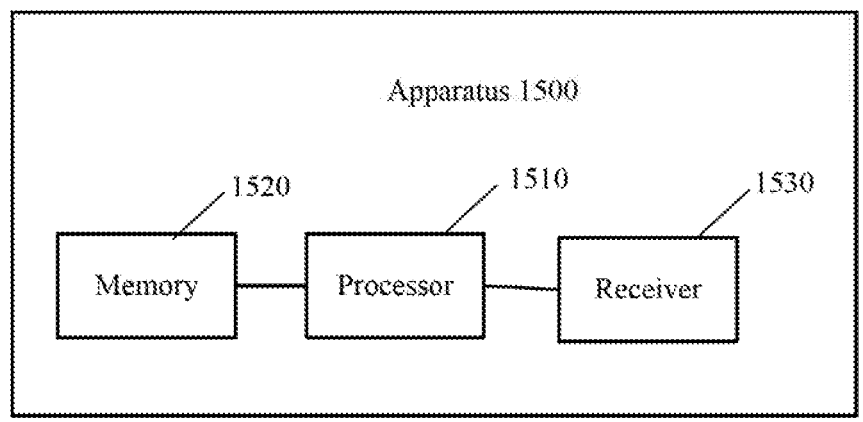
FIG. 17 is a schematic block diagram of a data transmission apparatus according to another embodiment of the present invention.

FIG. 17 is a schematic block diagram of a data transmission apparatus 1500 according to an embodiment of the present invention. As shown in FIG. 17, the apparatus 1500 includes a processor 1510 and a receiver 1530.

The receiver 1530 is configured to perform, on time domain and frequency domain resources of a contention transmission unit CTU, blind detection of a pilot in a code element-pilot combination. The CTU is a transmission resource including at least the time domain resource, the frequency domain resource, a code domain resource, and a pilot resource. A code element of the code domain resource and the pilot resource constitute a code element-pilot combination. Pilots in different code element-pilot combinations are mutually orthogonal.

The processor 1510 is configured to decode, by using code elements in code element-pilot combinations corresponding to a pilot sequence obtained by means of blind detection, a control word in uplink data received on the time domain and frequency domain resources of the CTU, to obtain instruction information, where the instruction information is used to instruct whether to perform combined decoding on a corresponding data portion; and perform combined decoding on data portions of uplink data that is sent by a same terminal device and in which the instruction information instructs to perform combined decoding on the corresponding data portions of the uplink data.

Optionally, the code element is a CDMA code, a sparse code multiple access SCMA codebook, or a low-density signature LDS sequence.

Optionally, the SCMA codebook includes two or more code words. The code word is a multi-dimensional complex number vector, and is used to represent a mapping relationship between data and at least two modulation symbols. The at least two modulation symbols include at least one zero modulation symbol and at least one non-zero modulation symbol.

Optionally, code elements in all or some code element-pilot combinations included in the CTU are the same.

Optionally, the CTU is a grant-free transmission resource.

Optionally, the code element-pilot combination includes at least one code element and one pilot.

Optionally, the apparatus 1500 is a network device.

In this embodiment of the present invention, in addition to the processor 1510 and the receiver 1530, the apparatus 1500 may further include another part, for example, a memory 1520. The memory 1520 is configured to store corresponding code, and the processor 1510 calls the code to execute a corresponding operation.

Optionally, the processor 1510, the memory 1520, and the receiver 1530 may be connected to each other by using a bus.

It should be understood that the apparatus 1500 may be corresponding to the network device in the method 700, and can implement corresponding functions thereof. For brevity, details are not further described herein.

Therefore, in this embodiment of the present invention, a terminal device determines a CTU to be used by to-be-sent uplink data; encodes the to-be-sent uplink data by using code elements in multiple different code element-pilot combinations of the determined CTU, to obtain N groups of encoded data; and sends the N groups of encoded data and a corresponding pilot by using time domain and frequency domain resources that are corresponding to the determined CTU. In this way, when the terminal device sends the uplink data, provided that a used code element-pilot combination does not conflict with a code element-pilot combination that is used by another terminal device, a receive end can correctly obtain the uplink data sent by the terminal device, thereby improving data reception reliability at the receive end. In addition, the terminal device may add a combined decoding instruction to control words of the N groups of to-be-sent data. When decoding control words of multiple groups of transmitted data, the receive end may perform combined decoding on data portions of the multiple groups of transmitted data.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, refer to a corresponding process in the foregoing method embodiments, and details are not further described herein. It may be understood that, to make the application document brief and clear, technical features and descriptions in any of the foregoing embodiments may be applicable to other embodiments. For example, the technical features of the method embodiments may be applicable to the apparatus embodiments or other method embodiments, and details are not further described in other embodiments.

The sending unit or the transmitter in the embodiments may perform transmission on an air interface, or instead of performing transmission on an air interface, send data to another device, so that the another device performs transmission on the air interface. The receiving unit or the receiver in the embodiments may perform reception over an air interface, or instead of performing reception over an air interface, receive data from another device that performs reception on the air interface.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electronic, mechanical, or other forms.

The units described as separate parts may or may not be physically separate. Parts displayed as units may or may not be physical units, and may be located in one position or may be distributed in a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

Further embodiments of the present invention are provided in the following. It should be noted that the numbering used in the following section does not necessarily need to comply with the numbering used in the previous sections. Each embodiment starts from a numbering. The numbering of following embodiments may not be consecutive.

10. A data transmission method, comprising:
determining a contention transmission unit CTU to be used by to-be-sent uplink data, wherein the CTU is a transmission resource comprising at least a time domain resource, a frequency domain resource, a code domain resource, and a pilot resource, a code element of the code domain resource and the pilot resource constitute a code element-pilot combination, and pilots in different code element-pilot combinations are mutually orthogonal;
encoding the to-be-sent uplink data by using code elements in N different code element-pilot combinations in the transmission resource corresponding to the determined CTU, to obtain N groups of encoded data, wherein N is a positive integer greater than or equal to 2; and
sending, by using the time domain and frequency domain resources that are corresponding to the determined CTU, the N groups of encoded data and pilots in the N code element-pilot combinations.

11. The method according to embodiment 10, wherein each group of the N groups of encoded data comprises a control word, wherein the control word is used to instruct a receive end whether to perform combined decoding on a corresponding data portion in the encoded data.

12. The method according to embodiment 11, wherein control words comprised in P groups of the N groups of encoded data are used to instruct the receive end to perform combined decoding on a corresponding data portion in the encoded data, wherein channel encoding bit rates of data portions in the P groups of encoded data are the same.

13. The method according to embodiment 11 or 12, wherein a bit rate for performing channel encoding on the control word is less than a bit rate for performing channel encoding on the data portion in the to-be-sent uplink data.

14. The method according to any one of embodiments 11 to 13, wherein the code element is a CDMA code, a sparse code multiple access SCMA codebook, or a low-density signature LDS sequence.

15. The method according to embodiment 14, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

16. The method according to any one of embodiments 11 to 15, wherein code elements in all or some code element-pilot combinations comprised in the CTU are the same.

17. The method according to any one of embodiments 11 to 16, wherein the CTU is a grant-free transmission resource.

18. The method according to any one of embodiments 11 to 17, wherein the code element-pilot combination comprises at least one code element and one pilot.

19. A data transmission method, comprising:
decoding, by using a code element of a code domain resource of a contention transmission unit CTU, a control word in uplink data received on time domain and frequency domain resources of the CTU, to obtain instruction information, wherein the CTU is a transmission resource comprising at least the time domain resource, the frequency domain resource, and the code domain resource, and the instruction information is used to instruct whether to perform combined decoding on a corresponding data portion; and
performing combined decoding on data portions of uplink data that is sent by a same terminal device and in which the instruction information instructs to perform combined decoding on the corresponding data portions of the uplink data.

20. The method according to embodiment 19, wherein the code element is a CDMA code, a sparse code multiple access SCMA codebook, or a low-density signature LDS sequence.

21. The method according to embodiment 20, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

22. The method according to any one of embodiments 19 to 21, wherein the transmission resource further comprises a pilot resource, wherein the code element of the code domain resource and the pilot resource constitute a code element-pilot combination, pilots in different code element-pilot combinations are mutually orthogonal, and code elements in different code element-pilot combinations are different;
before the decoding a control word in uplink data by using a code element of the CTU to obtain instruction information, the method further comprises: performing, on the time domain resource and the frequency domain resource of the CTU, blind detection of a pilot in a code element-pilot combination; and
the decoding a control word in uplink data by using a code element of a code domain resource in the CTU comprises:

decoding the control word in the uplink data by using a code element in a code element-pilot combination corresponding to a pilot sequence obtained by means of blind detection, to obtain the instruction information.

23. The method according to any one of embodiments 19 to 22, wherein the CTU is a grant-free transmission resource.

24. A data transmission method, comprising:

performing, on time domain and frequency domain resources of a contention transmission unit CTU, blind detection of a pilot in a code element-pilot combination, wherein the CTU is a transmission resource comprising at least the time domain resource, the frequency domain resource, a code domain resource, and a pilot resource, a code element of the code domain resource and the pilot resource constitute a code element-pilot combination, and pilots in different code element-pilot combinations are mutually orthogonal;

decoding, by using code elements in code element-pilot combinations corresponding to a pilot sequence obtained by means of blind detection, a control word in uplink data received on the time domain and frequency domain resources of the CTU, to obtain instruction information, wherein the instruction information is used to instruct whether to perform combined decoding on a corresponding data portion; and performing combined decoding on data portions of uplink data that is sent by a same terminal device and in which the instruction information instructs to perform combined decoding on the corresponding data portions of the uplink data.

25. The method according to embodiment 24, wherein the code element is a CDMA code, a sparse code multiple access SCMA codebook, or a low-density signature LDS sequence.

26. The method according to embodiment 25, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

27. The method according to any one of embodiments 24 to 26, wherein code elements in all or some code element-pilot combinations comprised in the CTU are the same.

28. The method according to any one of embodiments 24 to 27, wherein the CTU is a grant-free transmission resource.

29. The method according to any one of embodiments 24 to 28, wherein the code element-pilot combination comprises at least one code element and one pilot.

30. A data transmission apparatus, comprising:

a determining unit, configured to determine a contention transmission unit CTU to be used by to-be-sent uplink data, wherein the CTU is a transmission resource comprising at least a time domain resource, a frequency domain resource, and a code domain resource;

an encoding unit, configured to encode the to-be-sent uplink data by using N different code element groups in the code domain resource corresponding to the CTU determined by the determining unit, to obtain N groups of encoded data, wherein N is a positive integer greater than or equal to 2; and a sending unit, configured to send the N groups of encoded data by using the time domain and frequency domain resources that are corresponding to the CTU determined by the determining unit.

31. The apparatus according to embodiment 30, wherein each group of the N groups of encoded data comprises a control word and a data portion, wherein the control word is used to instruct a receive end whether to perform combined decoding on a corresponding data portion in the encoded data.

32. The apparatus according to embodiment 31, wherein control words comprised in P groups of the N groups of encoded data are used to instruct the receive end to perform combined decoding on a corresponding data portion in the encoded data, wherein channel encoding bit rates of data portions in the P groups of encoded data are the same, and P is a positive integer greater than or equal to 2 and less than or equal to N.

33. The apparatus according to embodiment 31 or 32, wherein a bit rate for performing channel encoding on the control word by the encoding unit is less than a bit rate for performing channel encoding on the data portion in the to-be-sent uplink data.

34. The apparatus according to any one of embodiments 30 to 33, wherein a code element in the code domain resource is a Code Division Multiple Access CDMA code, a sparse code multiple access SCMA codebook, or a low-density signature LDS sequence.

35. The apparatus according to embodiment 34, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

36. The apparatus according to any one of embodiments 30 to 35, wherein the transmission resource further comprises a pilot resource, wherein the code element of the code domain resource and the pilot resource constitute a code element-pilot combination, pilots in different code element-pilot combinations are mutually orthogonal, and code elements in code element groups in different code element-pilot combinations are different.

37. The apparatus according to embodiment 36, wherein the sending unit is further configured to:

send, by using the time domain and frequency domain resources that are corresponding to the determined CTU, a pilot sequence in code element-pilot combinations corresponding to the N groups of encoded data.

38. The apparatus according to any one of embodiments 30 to 37, wherein the CTU is a grant-free transmission resource.

39. The apparatus according to any one of embodiments 30 to 38, wherein the apparatus is a terminal device.

40. A data transmission apparatus, comprising: a determining unit, configured to determine a contention transmission unit CTU to be used by to-be-sent uplink data, wherein the CTU is a transmission resource comprising at least a time domain resource, a frequency domain resource, a code domain resource, and a pilot resource, a code element of the code domain resource and the pilot resource constitute a code element-pilot combination, and pilots in different code element-pilot combinations are mutually orthogonal;

an encoding unit, configured to encode the to-be-sent uplink data by using code elements in N different code element-pilot combinations in the transmission resource corresponding to the CTU determined by the determining unit, to obtain N groups of encoded data, wherein N is a positive integer greater than or equal to 2; and a sending unit, configured to send, by using the time domain and frequency domain resources that are corresponding to the CTU determined by the determining unit, the N groups of encoded data and pilots in the N code element-pilot combinations.

41. The apparatus according to embodiment 40, wherein each group of the N groups of encoded data comprises a control word, wherein the control word is used to instruct a receive end whether to perform combined decoding on a corresponding data portion in the encoded data.

42. The apparatus according to embodiment 41, wherein control words comprised in P groups of the N groups of encoded data are used to instruct the receive end to perform combined decoding on a corresponding data portion in the encoded data, wherein channel encoding bit rates of data portions in the P groups of encoded data are the same.

43. The apparatus according to embodiment 41 or 42, wherein a bit rate for performing channel encoding on the control word by the encoding unit is less than a bit rate for performing channel encoding on the data portion in the to-be-sent uplink data.

44. The apparatus according to any one of embodiments 41 to 43, wherein the code element is a CDMA code, a sparse code multiple access SCMA codebook, or a low-density signature LDS sequence.

45. The apparatus according to embodiment 44, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

46. The apparatus according to any one of embodiments 41 to 45, wherein code elements in all or some code element-pilot combinations comprised in the CTU are the same.

47. The apparatus according to any one of embodiments 41 to 46, wherein the CTU is a grant-free transmission resource.

48. The apparatus according to any one of embodiments 41 to 47, wherein the code element-pilot combination comprises at least one code element and one pilot.

49. The apparatus according to any one of embodiments 41 to 48, wherein the apparatus is a terminal device.

50. A data transmission apparatus, comprising:
a first decoding unit, configured to decode, by using a code element of a code domain resource of a contention transmission unit CTU, a control word in uplink data received on time domain and frequency domain resources of the CTU, to obtain instruction information, wherein the CTU is a transmission resource comprising at least the time domain resource, the frequency domain resource, and the code domain resource, and the instruction information is used to instruct whether to perform combined decoding on a corresponding data portion; and
a second decoding unit, configured to perform combined decoding on data portions of uplink data that is sent by a same terminal device and in which the instruction information instructs to perform combined decoding on the corresponding data portions of the uplink data.

51. The apparatus according to embodiment 50, wherein the code element is a CDMA code, a sparse code multiple access SCMA codebook, or a low-density signature LDS sequence.

52. The apparatus according to embodiment 51, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

53. The apparatus according to any one of embodiments 50 to 52, wherein the transmission resource further comprises a pilot resource, wherein the code element of the code domain resource and the pilot resource constitute a code element-pilot combination, pilots in different code element-pilot combinations are mutually orthogonal, and code elements in different code element-pilot combinations are different;
before the decoding a control word in uplink data by using a code element of the CTU to obtain instruction information, the apparatus further comprises a detection unit, configured to perform, on the time domain resource and the frequency domain resource of the CTU, blind detection of a pilot in a code element-pilot combination; and
the first decoding unit is specifically configured to:
decode the control word in the uplink data by using code elements in code element-pilot combinations corresponding to a pilot sequence obtained by means of blind detection, to obtain the instruction information.

54. The apparatus according to any one of embodiments 50 to 53, wherein the CTU is a grant-free transmission resource.

55. The apparatus according to any one of embodiments 50 to 54, wherein the apparatus is a network device.

56. A data transmission apparatus, comprising:
a detection unit, configured to perform, on time domain and frequency domain resources of a contention transmission unit CTU, blind detection of a pilot in a code element-pilot combination, wherein the CTU is a transmission resource comprising at least the time domain resource, the frequency domain resource, a code domain resource, and a pilot resource, a code element of the code domain resource and the pilot resource constitute a code element-pilot combination, and pilots in different code element-pilot combinations are mutually orthogonal;
a first decoding unit, configured to decode, by using code elements in code element-pilot combinations corresponding to a pilot sequence obtained by means of blind detection by the detection unit, a control word in uplink data received on the time domain and frequency domain resources of the CTU, to obtain instruction information, wherein the instruction information is used to instruct whether to perform combined decoding on a corresponding data portion; and
a second decoding unit, configured to perform combined decoding on data portions of uplink data that is sent by a same terminal device and in which the instruction information instructs to perform combined decoding on the corresponding data portions of the uplink data.

57. The apparatus according to embodiment 56, wherein the code element is a CDMA code, a sparse code multiple access SCMA codebook, or a low-density signature LDS sequence.

58. The apparatus according to embodiment 57, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

59. The apparatus according to any one of embodiments 56 to 58, wherein code elements in all or some code element-pilot combinations comprised in the CTU are the same.

60. The apparatus according to any one of embodiments 56 to 59, wherein the CTU is a grant-free transmission resource.

61. The apparatus according to any one of embodiments 56 to 60, wherein the code element-pilot combination comprises at least one code element and one pilot.

62. The apparatus according to any one of embodiments 56 to 61, wherein the apparatus is a network device.

63. A data transmission apparatus, comprising a processor and a transmitter, wherein the processor is configured to: determine a contention transmission unit CTU to be used by to-be-sent uplink data, wherein the CTU is a transmission resource comprising at least a time domain resource, a frequency domain resource, and a code domain resource; and encode the to-be-sent uplink data by using N different code element groups in the code domain resource corresponding to the determined CTU, to obtain N groups of encoded data, wherein N is a positive integer greater than or equal to 2; and the transmitter is configured to send the N groups of encoded data by using the time domain and frequency domain resources that are corresponding to the CTU determined by the processor.

64. The apparatus according to embodiment 63, wherein each group of the N groups of encoded data comprises a control word and a data portion, wherein the control word is used to instruct a receive end whether to perform combined decoding on a corresponding data portion in the encoded data.

65. The apparatus according to embodiment 64, wherein control words comprised in P groups of the N groups of encoded data are used to instruct the receive end to perform combined decoding on a corresponding data portion in the encoded data, wherein channel encoding bit rates of data portions in the P groups of encoded data are the same, and P is a positive integer greater than or equal to 2 and less than or equal to N.

66. The apparatus according to embodiment 64 or 65, wherein a bit rate for performing channel encoding on the control word is less than a bit rate for performing channel encoding on the data portion in the to-be-sent uplink data.

67. The apparatus according to any one of embodiments 63 to 66, wherein a code element in the code domain resource is a Code Division Multiple Access CDMA code, a sparse code multiple access SCMA codebook, or a low-density signature LDS sequence.

68. The apparatus according to embodiment 67, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

69. The apparatus according to any one of embodiments 63 to 68, wherein the transmission resource further comprises a pilot resource, wherein the code element of the code domain resource and the pilot resource constitute a code element-pilot combination, pilots in different code element-pilot combinations are mutually orthogonal, and code elements in code element groups in different code element-pilot combinations are different.

70. The apparatus according to embodiment 69, wherein the transmitter is further configured to:

send, by using the time domain and frequency domain resources that are corresponding to the CTU determined by the processor, a pilot sequence in code element-pilot combinations corresponding to the N groups of encoded data.

71. The apparatus according to any one of embodiments 63 to 70, wherein the CTU is a grant-free transmission resource.

72. The apparatus according to any one of embodiments 63 to 71, wherein the apparatus is a terminal device.

83. A data transmission apparatus, comprising a processor and a receiver, wherein the receiver is configured to receive, on time domain and frequency domain resources of a CTU, a control word in uplink data, wherein the CTU is a transmission resource comprising at least the time domain resource, the frequency domain resource, and a code domain resource, and instruction information is used to instruct whether to perform combined decoding on a corresponding data portion;

the processor is configured to decode the control word by using a code element of the code domain resource of the contention transmission unit CTU, to obtain the instruction information; and perform combined decoding on data portions of uplink data that is sent by a same terminal device and in which the instruction information instructs to perform combined decoding on the corresponding data portions of the uplink data.

84. The apparatus according to embodiment 83, wherein the code element is a CDMA code, a sparse code multiple access SCMA codebook, or a low-density signature LDS sequence.

85. The apparatus according to embodiment 84, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

86. The apparatus according to any one of embodiments 83 to 85, wherein the transmission resource further comprises a pilot resource, wherein the code element of the code domain resource and the pilot resource constitute a code element-pilot combination, pilots in different code element-pilot combinations are mutually orthogonal, and code elements in different code element-pilot combinations are different;

the receiver is further configured to:

before the processor decodes the control word in the uplink data by using the code element of the CTU to obtain the instruction information, perform, on the time domain resource and the frequency domain resource of the CTU, blind detection of a pilot in a code element-pilot combination; and the processor is further configured to decode the control word in the uplink data by using code elements in code element-pilot combinations corresponding to a pilot sequence obtained by means of blind detection, to obtain the instruction information.

87. The apparatus according to any one of embodiments 83 to 86, wherein the CTU is a grant-free transmission resource.

88. The apparatus according to any one of embodiments 83 to 87, wherein the apparatus is a network device.

89. A data transmission apparatus, comprising a processor and a receiver, wherein the receiver is configured to perform, on time domain and frequency domain resources of a contention transmission unit CTU, blind detection of a pilot in a code element-pilot combination, wherein the CTU is a transmission resource comprising at least the time domain resource, the frequency domain resource, a code domain resource, and a pilot resource, a code element of the code domain resource and the pilot resource constitute a code element-pilot combination, and pilots in different code element-pilot combinations are mutually orthogonal;

the processor is configured to decode, by using code elements in code element-pilot combinations corresponding to a pilot sequence obtained by means of blind detection, a control word in uplink data received on the time domain and frequency domain resources of the CTU, to obtain instruction information, wherein the instruction information is used to instruct whether to perform combined decoding on a corresponding data portion; and perform combined decoding on data portions of uplink data that is sent by a same terminal device and in which the instruction information instructs to perform combined decoding on the corresponding data portions of the uplink data.

90. The apparatus according to embodiment 89, wherein the code element is a CDMA code, a sparse code multiple access SCMA codebook, or a low-density signature LDS sequence.

91. The apparatus according to embodiment 90, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

92. The apparatus according to any one of embodiments 89 to 91, wherein code elements in all or some code element-pilot combinations comprised in the CTU are the same.

93. The apparatus according to any one of embodiments 89 to 92, wherein the CTU is a grant-free transmission resource.

94. The apparatus according to any one of embodiments 89 to 93, wherein the code element-pilot combination comprises at least one code element and one pilot.

95. The apparatus according to any one of embodiments 89 to 94, wherein the apparatus is a network device.

What is claimed is:

1. A data transmission method, comprising:
   determining a contention transmission unit (CTU) to be used by to-be-sent uplink data, wherein the CTU is a transmission resource comprising at least a time domain resource, a frequency domain resource, and a code domain resource;
   encoding the to-be-sent uplink data by using N different code element groups in the code domain resource corresponding to the determined CTU, to obtain N groups of encoded data, wherein each group of the N groups of encoded data comprises a control word and a data portion, wherein the control word is used to instruct a receive end whether to perform combined decoding on a corresponding data portion in the encoded data, and wherein N is a positive integer greater than or equal to 2; and
   sending the N groups of encoded data by using the time domain and frequency domain resources that are corresponding to the determined CTU.

2. The method according to claim 1, wherein control words comprised in P groups of the N groups of encoded data are used to instruct the receive end to perform combined decoding on a corresponding data portion in the encoded data, wherein channel encoding bit rates of data portions in the P groups of encoded data are the same, and P is a positive integer greater than or equal to 2 and less than or equal to N.

3. The method according to claim 1, wherein a bit rate for performing channel encoding on the control word is less than a bit rate for performing channel encoding on the data portion in the to-be-sent uplink data.

4. The method according to claim 1, wherein a code element in the code domain resource is a Code Division Multiple Access (CDMA) code, a sparse code multiple access (SCMA) codebook, or a low-density signature LDS sequence.

5. The method according to claim 4, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

6. The method according to claim 1, wherein the transmission resource further comprises a pilot resource, wherein the code element of the code domain resource and the pilot resource constitute a code element-pilot combination, pilots in different code element-pilot combinations are mutually orthogonal, and code elements in code element groups in different code element-pilot combinations are different.

7. The method according to claim 6, wherein the method further comprises:
   sending, by using the time domain and frequency domain resources that are corresponding to the determined CTU, a pilot sequence in a code element-pilot combination corresponding to the N groups of encoded data.

8. A data transmission method, comprising:
   determining a contention transmission unit (CTU) to be used by to-be-sent uplink data, wherein the CTU is a transmission resource comprising at least a time domain resource, a frequency domain resource, a code domain resource, and a pilot resource, a code element of the code domain resource and the pilot resource constitute a code element-pilot combination, and pilots in different code element-pilot combinations are mutually orthogonal;
   encoding the to-be-sent uplink data by using code elements in N different code element-pilot combinations in the transmission resource corresponding to the determined CTU, to obtain N groups of encoded data, wherein each group of the N groups of encoded data comprises a control word and a data portion, wherein the control word is used to instruct a receive end whether to perform combined decoding on a corresponding data portion in the encoded data, and wherein N is a positive integer greater than or equal to 2; and
   sending, by using the time domain and frequency domain resources that are corresponding to the determined CTU, the N groups of encoded data and pilots in the N code element-pilot combinations.

9. The method according to claim 8, wherein the code element-pilot combination comprises at least one code element and one pilot.

10. A data transmission apparatus, comprising:
    a processor configured to: determine a contention transmission unit (CTU) to be used by to-be-sent uplink data, wherein the CTU is a transmission resource comprising at least a time domain resource, a frequency domain resource, a code domain resource, and a pilot resource, a code element of the code domain resource and the pilot resource constitute a code element-pilot combination, and pilots in different code element-pilot combinations are mutually orthogonal; and encode the to-be-sent uplink data by using code elements in N different code element-pilot combinations in the transmission resource corresponding to the determined CTU, to obtain N groups of encoded data, wherein each group of the N groups of encoded data comprises a control word, wherein the control word is used to instruct a receive end whether to perform combined decoding on a corresponding data portion in the encoded data, and wherein N is a positive integer greater than or equal to 2; and a transmitter configured to send, by using the time domain and frequency domain resources that are corresponding to the CTU determined by the processor, the N groups of encoded data and pilots in the N code element-pilot combinations.

11. The apparatus according to claim 10, wherein control words comprised in P groups of the N groups of encoded data are used to instruct the receive end to perform combined decoding on a corresponding data portion in the encoded data, wherein channel encoding bit rates of data portions in the P groups of encoded data are the same.

12. The apparatus according to claim 10, wherein a bit rate for performing channel encoding on the control word is less than a bit rate for performing channel encoding on the data portion in the to-be-sent uplink data.

13. The apparatus according to claim 10, wherein the code element is a Code Division Multiple Access (CDMA) code, a sparse code multiple access (SCMA) codebook, or a low-density signature LDS sequence.

14. The apparatus according to claim 13, wherein the SCMA codebook comprises two or more code words, the code word is a multi-dimensional complex number vector, and is used to represent a mapping relationship between data and at least two modulation symbols, and the at least two modulation symbols comprise at least one zero modulation symbol and at least one non-zero modulation symbol.

15. The apparatus according to claim 10, wherein code elements in all or some code element-pilot combinations comprised in the CTU are the same.

16. The apparatus according to claim 10, wherein the code element-pilot combination comprises at least one code element and one pilot.

17. A data transmission apparatus, comprising:
a receiver configured to receive, on time domain and frequency domain resources of a contention transmission unit (CTU), a control word in uplink data, wherein the CTU is a transmission resource comprising at least the time domain resource, the frequency domain resource, and a code domain resource, and instruction information is used to instruct whether to perform combined decoding on a corresponding data portion; and a processor configured to decode the control word by using a code element of the code domain resource of the CTU, to obtain the instruction information, and to perform combined decoding on data portions of uplink data that is sent by a same terminal device and in which the instruction information instructs to perform combined decoding on the corresponding data portions of the uplink data.

* * * * *

UNITED STATES PATENT AND TRADEMARK OFFICE
CERTIFICATE OF CORRECTION

PATENT NO. : 10,554,328 B2
APPLICATION NO. : 15/858843
DATED : February 4, 2020
INVENTOR(S) : Xiuqiang Xu et al.

Page 1 of 1

It is certified that error appears in the above-identified patent and that said Letters Patent is hereby corrected as shown below:

On the Title Page

Item (73) Assignee, Line 1, delete "Techonologies" and insert --Technologies--.

Signed and Sealed this
Fourth Day of August, 2020

Andrei Iancu
*Director of the United States Patent and Trademark Office*